(12) United States Patent
Wheatley, III et al.

(10) Patent No.: US 10,381,874 B2
(45) Date of Patent: Aug. 13, 2019

(54) FILTER FOR IMPROVED DRIVER CIRCUIT EFFICIENCY AND METHOD OF OPERATION

(75) Inventors: Charles Edward Wheatley, III, Del Mar, CA (US); Zhen Ning Low, San Diego, CA (US); Stanley Slavko Toncich, San Diego, CA (US); Ngo Van Nguyen, San Diego, CA (US); Cody B. Wheeland, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 487 days.

(21) Appl. No.: 13/424,834

(22) Filed: Mar. 20, 2012

(65) Prior Publication Data

US 2012/0242284 A1    Sep. 27, 2012

Related U.S. Application Data

(60) Provisional application No. 61/467,853, filed on Mar. 25, 2011, provisional application No. 61/550,219, filed on Oct. 21, 2011.

(51) Int. Cl.
*H01F 38/14* (2006.01)
*H02J 17/00* (2006.01)
(Continued)

(52) U.S. Cl.
CPC ............. *H02J 50/12* (2016.02); *H02J 7/025* (2013.01); *H02J 17/00* (2013.01); *H02J 50/40* (2016.02)

(58) Field of Classification Search
CPC ............. H02J 17/00; H02J 50/40; H02J 7/025
(Continued)

(56) References Cited

U.S. PATENT DOCUMENTS 4,833,420 A * 5/1989 Ramet .................... H03H 1/02
330/107
5,129,006 A * 7/1992 Hill .......................... H03G 3/02
381/100
(Continued)

FOREIGN PATENT DOCUMENTS

CN     101933031 A    12/2010
CN     101945498 A     1/2011
(Continued)

OTHER PUBLICATIONS

Translation of O (EP 1796016 A2; Bernard).*
(Continued)

*Primary Examiner* — Rexford N Barnie
*Assistant Examiner* — Elim Ortiz

(57) ABSTRACT

This disclosure provides systems, methods and apparatus for increasing the efficiency of an amplifier when driven by a variable load. In one aspect a transmitter device is provided. The transmitter device includes a driver circuit characterized by an efficiency. The driver circuit is electrically connected to a transmit circuit characterized by an impedance. The transmitter device further includes a filter circuit electrically connected to the driver circuit and configured to modify the impedance to maintain the efficiency of the driver circuit at a level that is within 20% of a maximum efficiency of the driver circuit. The impedance is characterized by a complex impedance value that is within a range defined by a real first impedance value and a second real impedance value. A ratio of the first real impedance value to the second real impedance value is at least two to one.

54 Claims, 19 Drawing Sheets

(51) Int. Cl.
*H02J 50/12* (2016.01)
*H02J 50/40* (2016.01)
*H02J 7/02* (2016.01)

(58) Field of Classification Search
USPC .................. 320/108; 330/250, 251; 333/32
See application file for complete search history.

(56) References Cited

U.S. PATENT DOCUMENTS

| | | | |
|---|---|---|---|
| 5,535,438 A * | 7/1996 | Sevic | H03F 3/2176 |
| | | | 330/207 A |
| 5,610,553 A | 3/1997 | Kirn | |
| 6,236,847 B1 * | 5/2001 | Stikvoort | H03D 7/166 |
| | | | 455/190.1 |
| 6,344,780 B1 | 2/2002 | Dobashi et al. | |
| 7,092,691 B2 | 8/2006 | Bohn et al. | |
| 7,639,993 B1 * | 12/2009 | Shumarayev | H04L 7/033 |
| | | | 455/127.1 |
| 7,791,413 B2 | 9/2010 | Catoiu et al. | |
| 7,834,813 B2 | 11/2010 | Caimi et al. | |
| 8,400,017 B2 | 3/2013 | Kurs et al. | |
| 2002/0172458 A1 * | 11/2002 | Downie | G02B 6/293 |
| | | | 385/31 |
| 2004/0075492 A1 * | 4/2004 | Wight | H03C 1/50 |
| | | | 330/124 R |
| 2005/0029351 A1 * | 2/2005 | Yoshinaga | G06K 7/0008 |
| | | | 235/451 |
| 2005/0179505 A1 * | 8/2005 | Di Giandomenico | |
| | | | H03H 11/126 |
| | | | 333/17.1 |
| 2006/0068749 A1 * | 3/2006 | Ismail | H03F 3/45968 |
| | | | 455/339 |
| 2009/0096533 A1 | 4/2009 | Paul et al. | |
| 2010/0109445 A1 | 5/2010 | Kurs et al. | |
| 2010/0277003 A1 | 11/2010 | Von et al. | |
| 2010/0321165 A1 * | 12/2010 | Lee | G06K 7/0008 |
| | | | 340/10.4 |
| 2011/0057607 A1 | 3/2011 | Carobolante | |
| 2011/0080056 A1 | 4/2011 | Low et al. | |
| 2011/0133570 A1 * | 6/2011 | Mayo | H03F 3/2176 |
| | | | 307/104 |
| 2011/0193416 A1 * | 8/2011 | Campanella | H01Q 7/00 |
| | | | 307/104 |
| 2011/0201276 A1 * | 8/2011 | Forsell | A61B 5/0028 |
| | | | 455/41.2 |
| 2011/0217926 A1 | 9/2011 | Low et al. | |
| 2012/0155344 A1 | 6/2012 | Wiley et al. | |
| 2012/0223590 A1 | 9/2012 | Low et al. | |
| 2013/0033118 A1 | 2/2013 | Karalis et al. | |
| 2013/0038136 A1 | 2/2013 | Wheatley et al. | |
| 2013/0039395 A1 * | 2/2013 | Norconk | H04B 5/0031 |
| | | | 375/219 |
| 2014/0240057 A1 | 8/2014 | Low et al. | |
| 2016/0043574 A1 | 2/2016 | Low et al. | |

FOREIGN PATENT DOCUMENTS

| | | | | |
|---|---|---|---|---|
| CN | 102714429 A | 10/2012 | | |
| EP | 1494162 A2 | 1/2005 | | |
| EP | 1796016 A2 * | 6/2007 | ........... | G06K 7/0008 |
| EP | 1796016 A2 * | 6/2007 | ........... | G06K 7/0008 |
| EP | 1796016 A2 | 6/2007 | | |
| EP | 2528193 A1 | 11/2012 | | |
| FR | 2806563 A1 | 9/2001 | | |
| JP | H098576 A | 1/1997 | | |
| JP | 2001238372 A | 8/2001 | | |
| JP | 2003008384 A | 1/2003 | | |
| JP | 2005026741 A | 1/2005 | | |
| JP | 2007274247 A | 10/2007 | | |
| JP | 2007281573 A | 10/2007 | | |
| KR | 20090102890 A * | 10/2009 | | |
| WO | 199531037 A1 | 11/1995 | | |
| WO | 2004036736 A1 | 4/2004 | | |
| WO | WO2007031852 A1 | 3/2007 | | |
| WO | WO-2007031852 A1 * | 3/2007 | ........... | H01Q 1/2216 |
| WO | WO 2007031852 A1 * | 3/2007 | ........... | H01Q 1/2216 |
| WO | WO-2011028956 A2 | 3/2011 | | |
| WO | WO-2011032048 A1 | 3/2011 | | |

OTHER PUBLICATIONS

Imbornone, J., et al., "A Novel Technique for the Design of High Efficiency Power Amplifiers", 24th European Microwave Conference, Sep. 5-8, 1994, Nexus Business Communications, GB, vol. 2, Sep. 5, 1994 (Sep. 5, 1994), pp. 1154-1159, XP000678207, ISBN: 978-0-9518032-5-7.

Saad, P., et al., "Design of a Highly Efficient 2-4-GHz Octave Bandwidth GaN-HEMT Power Amplifier", IEEE Transactions on Microwave Theory and Techniques, IEEE Service Center, Iscataway, NJ, US, vol. 58, No. 7, Jul. 1, 2010 (Jul. 1, 2010), pp. 1677-1685, XP01131 0406, ISSN: 0018-9480.

Tu S H-J., "Class E RF tuned power amplifiers in CMOS technologies: theory and circuit design considerations", IEEE Communications Magazine, IEEE Service Center, Piscataway, US, vol. 42, No. 9, Sep. 1, 2004 (Sep. 1, 2004 ), pp. S6-S11, XP011119463, ISSN: 0163-6804, DOI:0.1109/MCOM.2004.1336718.

International Search Report and Written Opinion—PCT/US2012/029974—ISA/EPO—dated Jul. 16, 2012.

Raab, "Effects of Circuit Variations on the class E Tuned Power Amplifier", IEEE Journal of Solid State Circuits, vol. SC-13, No. 2, 1978, pp. 9.

Van Bezooijen, A.V., et al., "Adaptive Impedance-Matching Techniques for Controlling L Networks", Circuits and Systems I: Regular Papers, IEEE Transactions on; vol. 57 , Issue: 2; Digital Object Identifier: 10.1 109/TCSI.2009.2023764 Feb. 2010, pp. 495-505.

Whitehouse, "Circuit Analysis", Horwood Publishing, Chichester; MPG Book Ltd., Bodmin, Cornwall; ISBN 1-898563-40-3, 1997, pp. 77-78 & 139-164.

* cited by examiner

FILTER FOR IMPROVED DRIVER CIRCUIT EFFICIENCY AND METHOD OF OPERATION

CROSS REFERENCE TO RELATED APPLICATIONS

This application claims priority under 35 U.S.C. § 119(e) to U.S. Provisional Patent Application No. 61/467,853 entitled "CLASS E MATCHING AND HARMONIC LOW PASS FILTER" filed on Mar. 25, 2011, the disclosure of which is hereby incorporated by reference in its entirety. This application further claims priority under 35 U.S.C. § 119(e) to U.S. Provisional Patent Application No. 61/550,219 entitled "FILTER FOR IMPROVED DRIVER CIRCUIT EFFICIENCY AND METHOD OF OPERATION" filed on Oct. 21, 2011, the disclosure of which is also hereby

FIELD

The present invention relates generally to wireless power. More specifically, the disclosure is directed to improving the efficiency and power output of transmit circuit driving a variable load.

BACKGROUND

An increasing number and variety of electronic devices are powered via rechargeable batteries. Such devices include mobile phones, portable music players, laptop computers, tablet computers, computer peripheral devices, communication devices (e.g., Bluetooth devices), digital cameras, hearing aids, and the like. While battery technology has improved, battery-powered electronic devices increasingly require and consume greater amounts of power. As such, these devices constantly require recharging. Rechargeable devices are often charged via wired connections that require cables or other similar connectors that are physically connected to a power supply. Cables and similar connectors may sometimes be inconvenient or cumbersome and have other drawbacks. Wireless charging systems that are capable of transferring power in free space to be used to charge rechargeable electronic devices may overcome some of the deficiencies of wired charging solutions. As such, wireless charging systems and methods that efficiently and safely transfer power for charging rechargeable electronic devices are desirable.

SUMMARY OF THE INVENTION

Various implementations of systems, methods and devices within the scope of the appended claims each have several aspects, no single one of which is solely responsible for the desirable attributes described herein. Without limiting the scope of the appended claims, some prominent features are described herein.

Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale.

One aspect of the disclosure provides a transmitter device. The transmitter device includes a driver circuit characterized by an efficiency. The driver circuit is electrically connected to a transmit circuit characterized by an impedance. The transmitter device further includes a filter circuit electrically connected to the driver circuit and configured to modify the impedance to maintain the efficiency of the driver circuit at a level that is within 20% of a maximum efficiency of the driver circuit. The impedance is characterized by a complex impedance value. The complex impedance value is within a range defined by a first real impedance value and a second real impedance value. A ratio of the first real impedance value to the second real impedance value is at least two to one.

Another aspect of the disclosure provides an implementation of a method for filtering a transmit signal. The method includes driving a signal using a driver circuit characterized by an efficiency. The method further includes providing the signal to a transmit circuit characterized by an impedance. The method further includes modifying the impedance to maintain the efficiency of the driver circuit at a level that is within 20% of a maximum efficiency of the driver circuit. The impedance is characterized by a complex impedance value. The complex impedance value is within a range defined by a first real impedance value and a second real impedance value. A ratio of the first real impedance value to the second real impedance value is at least two to one.

Yet another aspect of the disclosure provides a transmitter device. The transmitter device includes means for transmitting being characterized by an impedance. The transmitter device further includes means for driving characterized by an efficiency. The means for driving is electrically connected to the means for transmitting. The transmitter device further includes means for filtering electrically connected to the means for driving and configured to modify the impedance to maintain the efficiency of the means for driving at a level that is within 20% of a maximum efficiency of the means for driving. The impedance is characterized by a complex impedance value. The complex impedance value is within a range defined by a first real impedance value and a second real impedance value. A ratio of the first real impedance value to the second real impedance value is at least two to one.

Yet another aspect provides an implementation of a method for designing a power transmitter apparatus. The method includes selecting characteristics of at least two elements of a group of elements including a driver circuit, a filter circuit, and an impedance shifting element. The method further includes determining, based on the selected characteristics of the at least two elements, a characteristic of a non-selected element such that the driver circuit operates at a level that is within 20% of a maximum efficiency over a range of complex impedance values. The range being defined by a first real impedance value and a second real impedance value. A ratio of the first real impedance value to the second impedance value being at least two to one.

Figure 1:
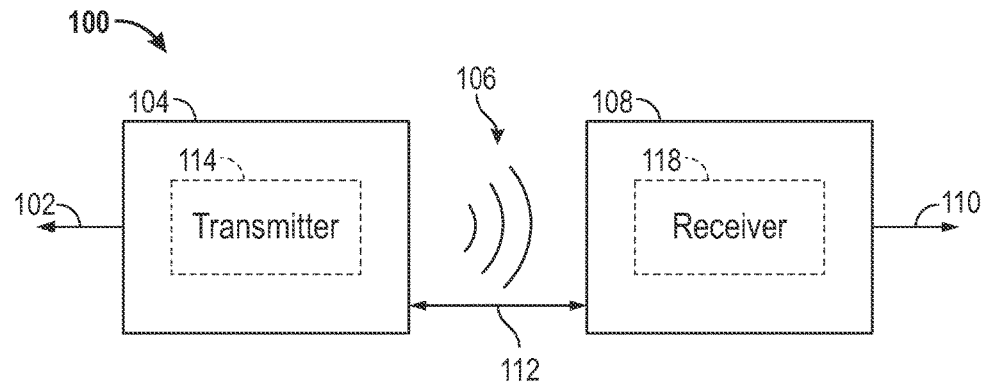
FIG. 1 is a functional block diagram of an exemplary wireless power transfer system, in accordance with exemplary embodiments of the invention.

The various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DETAILED DESCRIPTION

The detailed description set forth below in connection with the appended drawings is intended as a description of exemplary embodiments of the invention and is not intended to represent the only embodiments in which the invention may be practiced. The term "exemplary" used throughout this description means "serving as an example, instance, or illustration," and should not necessarily be construed as preferred or advantageous over other exemplary embodiments. The detailed description includes specific details for the purpose of providing a thorough understanding of the exemplary embodiments of the invention. The exemplary embodiments of the invention may be practiced without these specific details. In some instances, well-known structures and devices are shown in block diagram form in order to avoid obscuring the novelty of the exemplary embodiments presented herein.

Wirelessly transferring power may refer to transferring any form of energy associated with electric fields, magnetic fields, electromagnetic fields, or otherwise from a transmitter to a receiver without the use of physical electrical conductors (e.g., power may be transferred through free space). The power output into a wireless field (e.g., a magnetic field) may be received, captured by, or coupled by a "receiving coil" to achieve power transfer.

FIG. 1 is a functional block diagram of an exemplary wireless power transfer system 100, in accordance with exemplary embodiments of the invention. Input power 102 may be provided to a transmitter 104 from a power source (not shown) for generating a field 106 for providing energy transfer. A receiver 108 may couple to the field 106 and generate output power 110 for storing or consumption by a device (not shown) coupled to the output power 110. Both the transmitter 104 and the receiver 108 are separated by a distance 112. In one exemplary embodiment, transmitter 104 and receiver 108 are configured according to a mutual resonant relationship. When the resonant frequency of receiver 108 and the resonant frequency of transmitter 104 are substantially the same or very close, transmission losses between the transmitter 104 and the receiver 108 are minimal. As such, wireless power transfer may be provided over larger distance in contrast to purely inductive solutions that may require large coils that require coils to be very close (e.g., mms). Resonant inductive coupling techniques may thus allow for improved efficiency and power transfer over various distances and with a variety of inductive coil configurations.

The receiver 108 may receive power when the receiver 108 is located in an energy field 106 produced by the transmitter 104. The field 106 corresponds to a region where energy output by the transmitter 104 may be captured by a receiver 106. In some cases, the field 106 may correspond to the "near-field" of the transmitter 104 as will be further described below.

The transmitter 104 may include a transmit coil 114 for outputting an energy transmission. The receiver 108 further includes a receive coil 118 for receiving or capturing energy from the energy transmission. The near-field may correspond to a region in which there are strong reactive fields resulting from the currents and charges in the transmit coil 114 that minimally radiate power away from the transmit coil 114. In some cases the near-field may correspond to a region that is within about one wavelength (or a fraction thereof) of the transmit coil 114. The transmit and receive coils 114 and 118 are sized according to applications and devices to be associated therewith. As described above, efficient energy transfer may occur by coupling a large portion of the energy in a field 106 of the transmit coil 114 to a receive coil 118 rather than propagating most of the energy in an electromagnetic wave to the far field. When positioned within the field 106, a "coupling mode" may be developed between the transmit coil 114 and the receive coil 118. The area around the transmit and receive coils 114 and 118 where this coupling may occur is referred to herein as a coupling-mode region.

Figure 2:
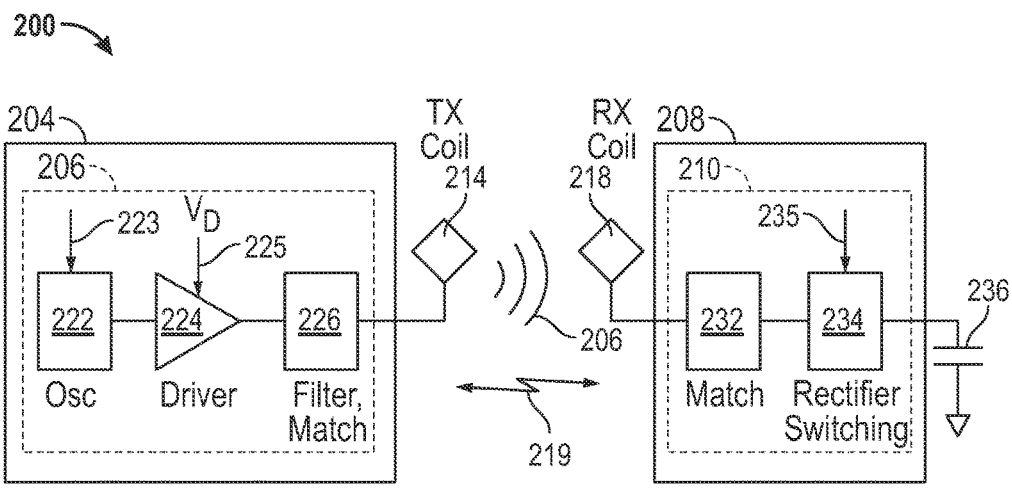
FIG. 2 is a functional block diagram of exemplary components that may be used in the wireless power transfer system of FIG. 1, in accordance with various exemplary embodiments of the invention.

FIG. 2 is a functional block diagram of exemplary components that may be used in the wireless power transfer system 100 of FIG. 1, in accordance with various exemplary embodiments of the invention. The transmitter 204 may include transmit circuitry 206 that may include an oscillator 222, a driver circuit 224, and a filter and matching circuit 226. The oscillator 222 may be configured to generate a signal at a desired frequency, such as 468.75 KHz, 6.78 MHz or 13.56 MHz, that may be adjusted in response to a frequency control signal 223. The oscillator signal may be provided to a driver circuit 224 configured to drive the transmit coil 214 at, for example, a resonant frequency of the transmit coil 214. The driver circuit 224 may be a switching amplifier configured to receive a square wave from the oscillator 222 and output a sine wave. For example, the driver circuit 224 may be a class E amplifier. A filter and matching circuit 226 may be also included to filter out harmonics or other unwanted frequencies and match the impedance of the transmitter 204 to the transmit coil 214. The filter and matching circuit 226 may be configured to perform a variety of impedance adjustments other than just matching the impedance of the transmitter 204 to the transmit coil 214.

The receiver 208 may include receive circuitry 210 that may include a matching circuit 232 (or any other type of impedance adjustment circuit) and a rectifier and switching circuit 234 to generate a DC power output from an AC power input to charge a battery 236 as shown in FIG. 2 or to power a device (not shown) coupled to the receiver 108. The matching circuit 232 may be included to match the impedance of the receive circuitry 210 to the receive coil 218. The receiver 208 and transmitter 204 may additionally communicate on a separate communication channel 219 (e.g., Bluetooth, zigbee, cellular, etc). The receiver 208 and transmitter 204 may alternatively communicate via in-band signaling using characteristics of the wireless field 206.

Figure 3:
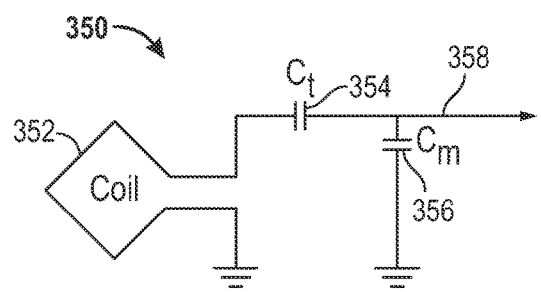
FIG. 3 is a schematic diagram of a portion of transmit circuitry or receive circuitry of FIG. 2 including a transmit or receive coil, in accordance with exemplary embodiments of the invention.

As described more fully below, receiver 208, that may initially have a selectively disablable associated load (e.g., battery 236), may be configured to determine whether an amount of power transmitted by transmitter 204 and received by receiver 208 is appropriate for charging a battery 236. Further, receiver 208 may be configured to enable a load (e.g., battery 236) upon determining that the amount of power is appropriate. In some embodiments, a receiver 208 may be configured to directly utilize power received from a wireless power transfer field without charging of a battery 236. For example, a communication device, such as a near-field communication (NFC) or radio-frequency identification device (RFID) may be configured to receive power from a wireless power transfer field and communicate by interacting with the wireless power transfer field and/or utilize the received power to communicate with a transmitter 204 or other devices FIG. 3 is a schematic diagram of a portion of transmit circuitry or receive circuitry of FIG. 2 including a transmit or receive coil 352, in accordance with exemplary embodiments of the invention. As illustrated in FIG. 3, transmit circuitry 350 used in exemplary embodiments may include a coil 352. The coil may also be referred to or be configured as a "loop" antenna 352. The coil 352 may also be referred to herein or configured as a "magnetic" antenna or an induction coil. The term "coil" is intended to refer to a component that may wirelessly output or receive energy for coupling to another "coil." The coil may also be referred to as an "antenna" of a type that is configured to wirelessly output or receive power. The coil may also be referred to as a wireless power transfer component of a type that is configured to wirelessly transmit or receive power. The coil 352 may be configured to include an air core or a physical core such as a ferrite core (not shown). Air core loop coils may be more tolerable to extraneous physical devices placed in the vicinity of the core. Furthermore, an air core loop coil 352 allows the placement of other components within the core area. In addition, an air core loop may more readily enable placement of the receive coil 218 (FIG. 2) within a plane of the transmit coil 214 (FIG. 2) where the coupled-mode region of the transmit coil 214 (FIG. 2) may be more powerful.

As stated, efficient transfer of energy between the transmitter 104 and receiver 108 may occur during matched or nearly matched resonance between the transmitter 104 and the receiver 108. However, even when resonance between the transmitter 104 and receiver 108 are not matched, energy may be transferred, although the efficiency may be affected. Transfer of energy occurs by coupling energy from the field 106 of the transmitting coil to the receiving coil residing in the neighborhood where this field 106 is established rather than propagating the energy from the transmitting coil into free space.

The resonant frequency of the loop or magnetic coils is based on the inductance and capacitance. Inductance may be simply the inductance created by the coil 352, whereas, capacitance may be added to the coil's inductance to create a resonant structure at a desired resonant frequency. As a non-limiting example, capacitor 354 and capacitor 356 may be added to the transmit circuitry 350 to create a resonant circuit that selects a signal 358 at a resonant frequency. Accordingly, for larger diameter coils, the size of capacitance needed to sustain resonance may decrease as the diameter or inductance of the loop increases. Furthermore, as the diameter of the coil increases, the efficient energy transfer area of the near-field may increase. Other resonant circuits formed using other components are also possible. As another non-limiting example, a capacitor may be placed in parallel between the two terminals of the coil 350. For transmit coils, a signal 358 with a frequency that substantially corresponds to the resonant frequency of the coil 352 may be an input to the coil 352.

In one embodiment, the transmitter 104 (FIG. 1) may be configured to output a time varying magnetic field with a frequency corresponding to the resonant frequency of the transmit coil 114. When the receiver is within the field 106, the time varying magnetic field may induce a current in the receive coil 118. As described above, if the receive coil 118 is configured to be resonant at the frequency of the transmit coil 118, energy may be efficiently transferred. The AC signal induced in the receive coil 118 may be rectified as described above to produce a DC signal that may be provided to charge or to power a load.

Figure 4:
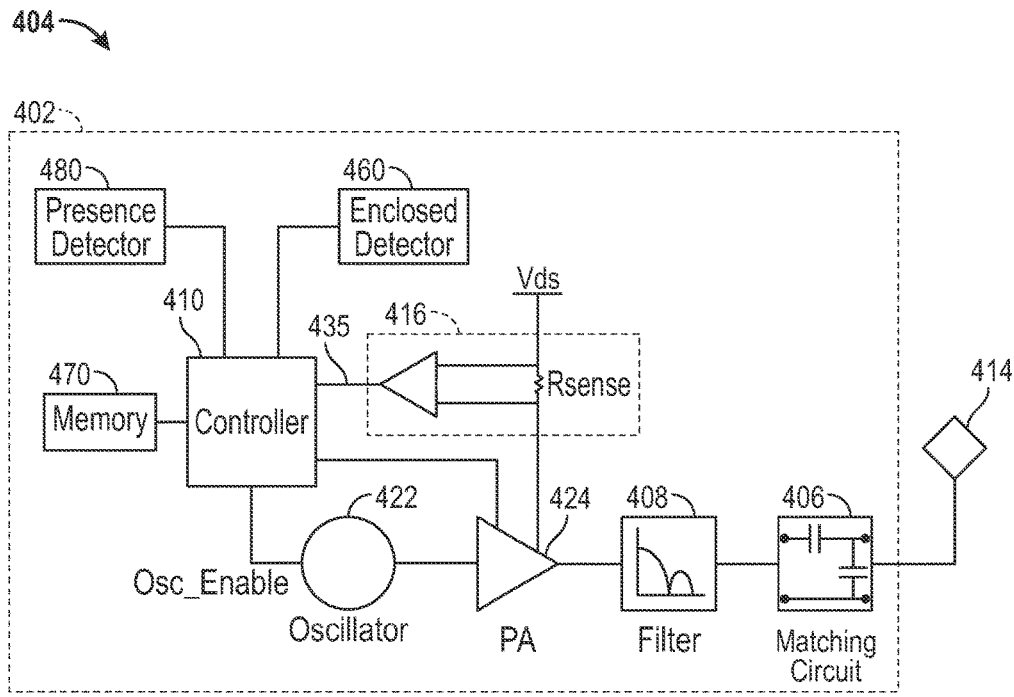
FIG. 4 is a functional block diagram of a transmitter that may be used in the wireless power transfer system of FIG. 1, in accordance with exemplary embodiments of the invention.

FIG. 4 is a functional block diagram of a transmitter 404 that may be used in the wireless power transfer system of FIG. 1, in accordance with exemplary embodiments of the invention. The transmitter 404 may include transmit circuitry 406 and a transmit coil 414. The transmit coil 414 may be the coil 352 as shown in FIG. 3. Transmit circuitry 406 may provide RF power to the transmit coil 414 by providing an oscillating signal resulting in generation of energy (e.g., magnetic flux) about the transmit coil 414. Transmitter 404 may operate at any suitable frequency. By way of example, transmitter 404 may operate at the 6.78 MHz ISM band.

Transmit circuitry 406 may include a fixed impedance matching circuit 406 for matching the impedance of the transmit circuitry 406 (e.g., 50 ohms) to the transmit coil 414 and a low pass filter (LPF) 408 configured to reduce harmonic emissions to levels to prevent self-jamming of devices coupled to receivers 108 (FIG. 1). Other exemplary embodiments may include different filter topologies, including but not limited to, notch filters that attenuate specific frequencies while passing others and may include an adaptive impedance match, that may be varied based on measurable transmit metrics, such as output power to the coil 414 or DC current drawn by the driver circuit 424. Transmit circuitry 406 further includes a driver circuit 424 configured to drive an RF signal as determined by an oscillator 422. The transmit circuitry 406 may be comprised of discrete devices or circuits, or alternately, may be comprised of an integrated assembly. An exemplary RF power output from transmit coil 414 may be on the order of 2.5 Watts.

Transmit circuitry 406 may further include a controller 410 for selectively enabling the oscillator 422 during transmit phases (or duty cycles) for specific receivers, for adjusting the frequency or phase of the oscillator 422, and for adjusting the output power level for implementing a communication protocol for interacting with neighboring devices through their attached receivers. It is noted that the controller 410 may also be referred to herein as processor 410. Adjustment of oscillator phase and related circuitry in the transmission path may allow for reduction of out of band emissions, especially when transitioning from one frequency to another.

The transmit circuitry 406 may further include a load sensing circuit 416 for detecting the presence or absence of active receivers in the vicinity of the near-field generated by transmit coil 414. By way of example, a load sensing circuit 416 monitors the current flowing to the driver circuit 424, that may be affected by the presence or absence of active receivers in the vicinity of the field generated by transmit coil 414 as will be further described below. Detection of changes to the loading on the driver circuit 424 are monitored by controller 410 for use in determining whether to enable the oscillator 422 for transmitting energy and to communicate with an active receiver. As described more fully below, a current measured at the driver circuit 424 may be used to determine whether an invalid device is positioned within a wireless power transfer region of the transmitter 404.

The transmit coil 414 may be implemented with a Litz wire or as an antenna strip with the thickness, width and metal type selected to keep resistive losses low. In a one implementation, the transmit coil 414 may generally be configured for association with a larger structure such as a table, mat, lamp or other less portable configuration. Accordingly, the transmit coil 414 generally may not need "turns" in order to be of a practical dimension. An exemplary implementation of a transmit coil 414 may be "electrically small" (i.e., fraction of the wavelength) and tuned to resonate at lower usable frequencies by using capacitors to define the resonant frequency.

The transmitter 404 may gather and track information about the whereabouts and status of receiver devices that may be associated with the transmitter 404. Thus, the transmitter circuitry 404 may include a presence detector 480, an enclosed detector 460, or a combination thereof, connected to the controller 410 (also referred to as a processor herein). The controller 410 may adjust an amount of power delivered by the driver circuit 424 in response to presence signals from the presence detector 480 and the enclosed detector 460. The transmitter 404 may receive power through a number of power sources, such as, for example, an AC-DC converter (not shown) to convert conventional AC power present in a building, a DC-DC converter (not shown) to convert a conventional DC power source to a voltage suitable for the transmitter 404, or directly from a conventional DC power source (not shown).

As a non-limiting example, the presence detector 480 may be a motion detector utilized to sense the initial presence of a device to be charged that is inserted into the coverage area of the transmitter 404. After detection, the transmitter 404 may be turned on and the RF power received by the device may be used to toggle a switch on the Rx device in a pre-determined manner, which in turn results in changes to the driving point impedance of the transmitter 404.

As another non-limiting example, the presence detector 480 may be a detector capable of detecting a human, for example, by infrared detection, motion detection, or other suitable means. In some exemplary embodiments, there may be regulations limiting the amount of power that a transmit coil 414 may transmit at a specific frequency. In some cases, these regulations are meant to protect humans from electromagnetic radiation. However, there may be environments where a transmit coil 414 is placed in areas not occupied by humans, or occupied infrequently by humans, such as, for example, garages, factory floors, shops, and the like. If these environments are free from humans, it may be permissible to increase the power output of the transmit coil 414 above the normal power restrictions regulations. In other words, the controller 410 may adjust the power output of the transmit coil 414 to a regulatory level or lower in response to human presence and adjust the power output of the transmit coil 414 to a level above the regulatory level when a human is outside a regulatory distance from the electromagnetic field of the transmit coil 414.

As a non-limiting example, the enclosed detector 460 (may also be referred to herein as an enclosed compartment detector or an enclosed space detector) may be a device such as a sense switch for determining when an enclosure is in a closed or open state. When a transmitter is in an enclosure that is in an enclosed state, a power level of the transmitter may be increased.

In exemplary embodiments, a method by which the transmitter 404 does not remain on indefinitely may be used. In this case, the transmitter 404 may be programmed to shut off after a user-determined amount of time. This feature prevents the transmitter 404, notably the driver circuit 424, from running long after the wireless devices in its perimeter are fully charged. This event may be due to the failure of the circuit to detect the signal sent from either the repeater or the receive coil that a device is fully charged. To prevent the transmitter 404 from automatically shutting down if another device is placed in its perimeter, the transmitter 404 automatic shut off feature may be activated only after a set period of lack of motion detected in its perimeter. The user may be able to determine the inactivity time interval, and change it as desired. As a non-limiting example, the time interval may be longer than that needed to fully charge a specific type of wireless device under the assumption of the device being initially fully discharged.

Figure 5:
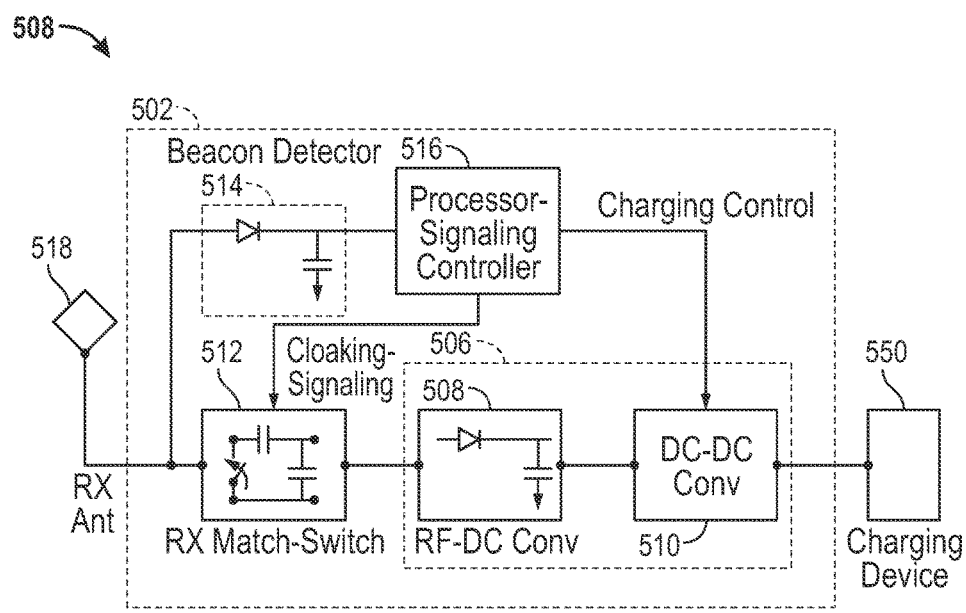
FIG. 5 is a functional block diagram of a receiver that may be used in the wireless power transfer system of FIG. 1, in accordance with exemplary embodiments of the invention.

FIG. 5 is a functional block diagram of a receiver 508 that may be used in the wireless power transfer system of FIG. 1, in accordance with exemplary embodiments of the invention. The receiver 508 includes receive circuitry 510 that may include a receive coil 518. Receiver 508 further couples to device 550 for providing received power thereto. It should be noted that receiver 508 is illustrated as being external to device 550 but may be integrated into device 550. Energy may be propagated wirelessly to receive coil 518 and then coupled through the rest of the receive circuitry 510 to device 550. By way of example, the charging device may include devices such as mobile phones, portable music players, laptop computers, tablet computers, computer peripheral devices, communication devices (e.g., Bluetooth devices), digital cameras, hearing aids (an other medical devices), and the like.

Receive coil 518 may be tuned to resonate at the same frequency, or within a specified range of frequencies, as transmit coil 414 (FIG. 4). Receive coil 518 may be similarly dimensioned with transmit coil 414 or may be differently sized based upon the dimensions of the associated device 550. By way of example, device 550 may be a portable electronic device having diametric or length dimension smaller that the diameter of length of transmit coil 414. In such an example, receive coil 518 may be implemented as a multi-turn coil in order to reduce the capacitance value of a tuning capacitor (not shown) and increase the receive coil's impedance. By way of example, receive coil 518 may be placed around the substantial circumference of device 550 in order to maximize the coil diameter and reduce the number of loop turns (i.e., windings) of the receive coil 518 and the inter-winding capacitance.

Receive circuitry 510 may provide an impedance match to the receive coil 518. Receive circuitry 510 includes power conversion circuitry 506 for converting a received RF energy source into charging power for use by the device 550. Power conversion circuitry 506 includes an RF-to-DC converter 508 and may also in include a DC-to-DC converter 510. RF-to-DC converter 508 rectifies the RF energy signal received at receive coil 518 into a non-alternating power with an output voltage represented by $V_{rect}$. The DC-to-DC converter 510 (or other power regulator) converts the rectified RF energy signal into an energy potential (e.g., voltage) that is compatible with device 550 with an output voltage and output current represented by $V_{out}$ and $I_{out}$. Various RF-to-DC converters are contemplated, including partial and full rectifiers, regulators, bridges, doublers, as well as linear and switching converters.

Receive circuitry 510 may further include switching circuitry 512 for connecting receive coil 518 to the power conversion circuitry 506 or alternatively for disconnecting the power conversion circuitry 506. Disconnecting receive coil 518 from power conversion circuitry 506 not only suspends charging of device 550, but also changes the "load" as "seen" by the transmitter 404 (FIG. 2).

As disclosed above, transmitter 404 includes load sensing circuit 416 that may detect fluctuations in the bias current provided to transmitter power driver circuit 410. Accordingly, transmitter 404 has a mechanism for determining when receivers are present in the transmitter's near-field.

When multiple receivers 508 are present in a transmitter's near-field, it may be desirable to time-multiplex the loading and unloading of one or more receivers to enable other receivers to more efficiently couple to the transmitter. A receiver 508 may also be cloaked in order to eliminate coupling to other nearby receivers or to reduce loading on nearby transmitters. This "unloading" of a receiver is also known herein as a "cloaking." Furthermore, this switching between unloading and loading controlled by receiver 508 and detected by transmitter 404 may provide a communication mechanism from receiver 508 to transmitter 404 as is explained more fully below. Additionally, a protocol may be associated with the switching that enables the sending of a message from receiver 508 to transmitter 404. By way of example, a switching speed may be on the order of 100 μsec.

In an exemplary embodiment, communication between the transmitter 404 and the receiver 508 refers to a device sensing and charging control mechanism, rather than conventional two-way communication (i.e., in band signaling using the coupling field). In other words, the transmitter 404 may use on/off keying of the transmitted signal to adjust whether energy is available in the near-field. The receiver may interpret these changes in energy as a message from the transmitter 404. From the receiver side, the receiver 508 may use tuning and de-tuning of the receive coil 518 to adjust how much power is being accepted from the field. In some cases, the tuning and de-tuning may be accomplished via the switching circuitry 512. The transmitter 404 may detect this difference in power used from the field and interpret these changes as a message from the receiver 508. It is noted that other forms of modulation of the transmit power and the load behavior may be utilized.

Receive circuitry 510 may further include signaling detector and beacon circuitry 514 used to identify received energy fluctuations, that may correspond to informational signaling from the transmitter to the receiver. Furthermore, signaling and beacon circuitry 514 may also be used to detect the transmission of a reduced RF signal energy (i.e., a beacon signal) and to rectify the reduced RF signal energy into a nominal power for awakening either un-powered or power-depleted circuits within receive circuitry 510 in order to configure receive circuitry 510 for wireless charging.

Receive circuitry 510 further includes processor 516 for coordinating the processes of receiver 508 described herein including the control of switching circuitry 512 described herein. Cloaking of receiver 508 may also occur upon the occurrence of other events including detection of an external wired charging source (e.g., wall/USB power) providing charging power to device 550. Processor 516, in addition to controlling the cloaking of the receiver, may also monitor beacon circuitry 514 to determine a beacon state and extract messages sent from the transmitter 404. Processor 516 may also adjust the DC-to-DC converter 510 for improved performance.

Figure 6:
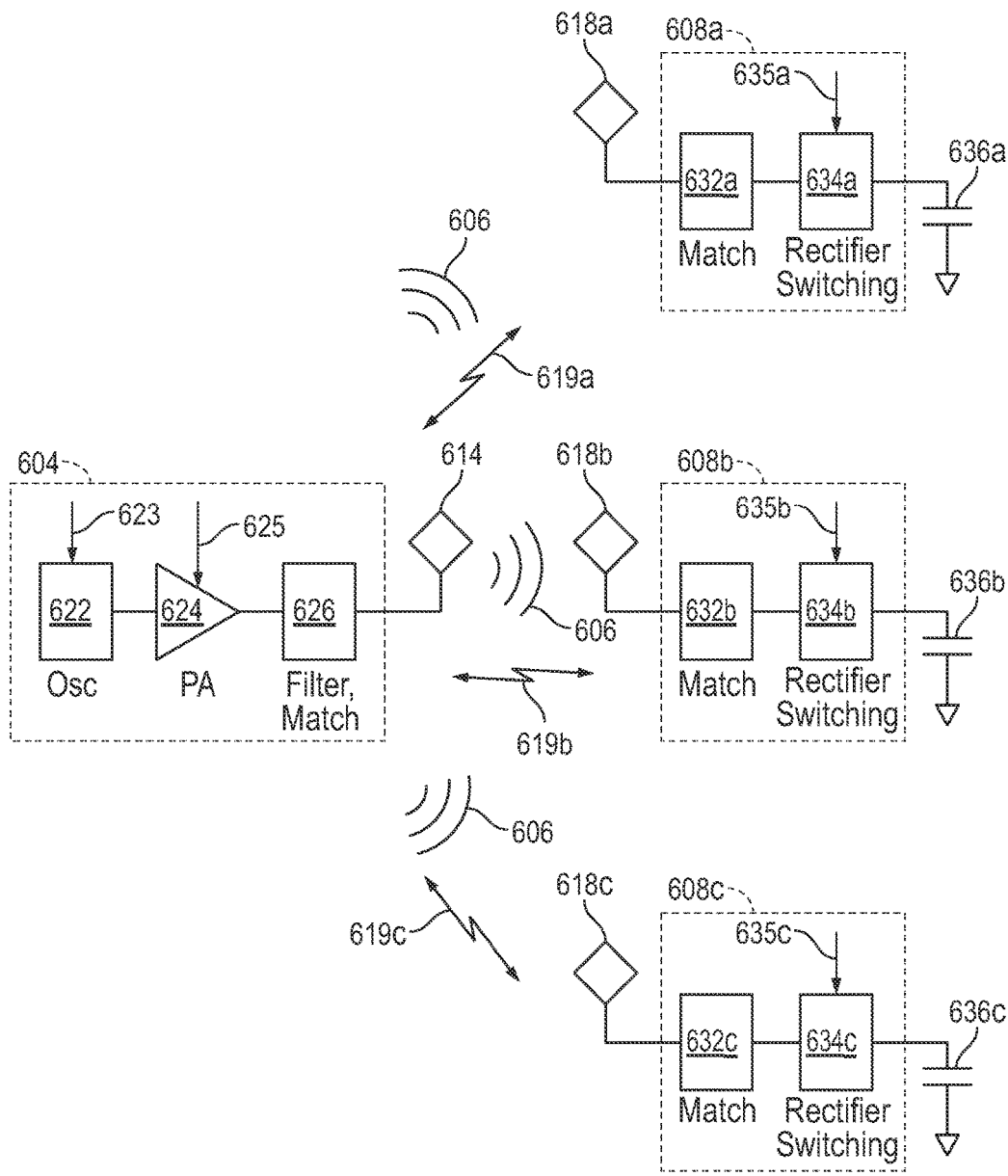
FIG. 6 is a functional block diagram of an exemplary wireless power transfer system as in FIG. 2, where a transmitter may wirelessly provide power to multiple receivers, in accordance with various exemplary embodiments of the invention.

FIG. 6 is a functional block diagram of an exemplary wireless power transfer system 600 as in FIG. 2, where a transmitter 604 may wirelessly provide power to multiple receivers 608a, 608b, and 608c, in accordance with various exemplary embodiments of the invention. As shown in FIG. 6, a transmitter 604 may transmit power via a transmit coil 614 via a field 606. Receiver devices 608a, 608b, and 608c may receive wireless power by coupling a portion of energy from the field 606 using receive coils 618a, 618b, and 618c to charge or power respective loads 636a, 636b, and 636c. Furthermore, the transmitter 604 may establish communication links 619a, 619b, and 616c with receivers 618a, 618b, and 618c respectively. While three receivers 608a, 608b, and 608c are shown, additional receivers (not shown) may receive power from the transmitter 604.

In a wireless power transfer system 600 the receivers 608a, 608b, or 608c may correspond to the load the transmitter drives while transferring power. As such, the load driven by the transmitter 604 may be a function of each receiver 608a, 608b, or 608c that is wirelessly receiving power from the field 606. When receivers 608a, 608b, or 608c enter the field 606, leave the field, or disable or enable their capability to receive power from the field 606, the load presented to the transmitter 604 is altered accordingly. The behavior of the transmitter 604 may be a function of characteristics of the variable load. For example, the efficiency at which the transmitter 604 may provide power to a receiver 608a, 608b, or 608c may vary as the load of the transmitter 604 varies. Furthermore, the amount of power that the transmitter 604 outputs may also vary as the load varies. Each of the receivers 608a, 608b, and 608c may form a portion of the load of the transmitter 404 when each receiver 608a, 608b, and 608c is receiving power via the field 606. The total impedance of the load seen by the transmit coil 614 may be a sum of impedances resulting from each receiver 608a, 608b, and 608c as the impedances they present to the transmit circuit 614 may combine in series.

In one aspect, exemplary embodiments are directed to a transmitter 604 that is suitable for efficiently charging a dynamic number of receivers 608a, 608b, and 608c. To efficiently allow for two receivers 608a and 608b to receive more power than when one receiver 608a is positioned to receive power, the transmitter 604 may be preferably designed such that the load (characterized by its impedance) at which the maximum power may be delivered is higher than the load at which the maximum transmitter efficiency may be provided. Furthermore, the transmitter 604 may be preferably designed to provide power at high efficiency over a range of load values as a variable number of receivers 608a, 608b, and 608c will result in a range of different loads being presented to the transmitter 604. Otherwise, significant power losses may arise. Moreover, the transmitter 604 may be preferably designed such that the load at which maximum power is provided is greater than a total load presented by multiple receivers 608a, 608b, 608c. In this case, the transmitter 604 may have sufficient power to supply multiple devices simultaneously.

Figure 7:
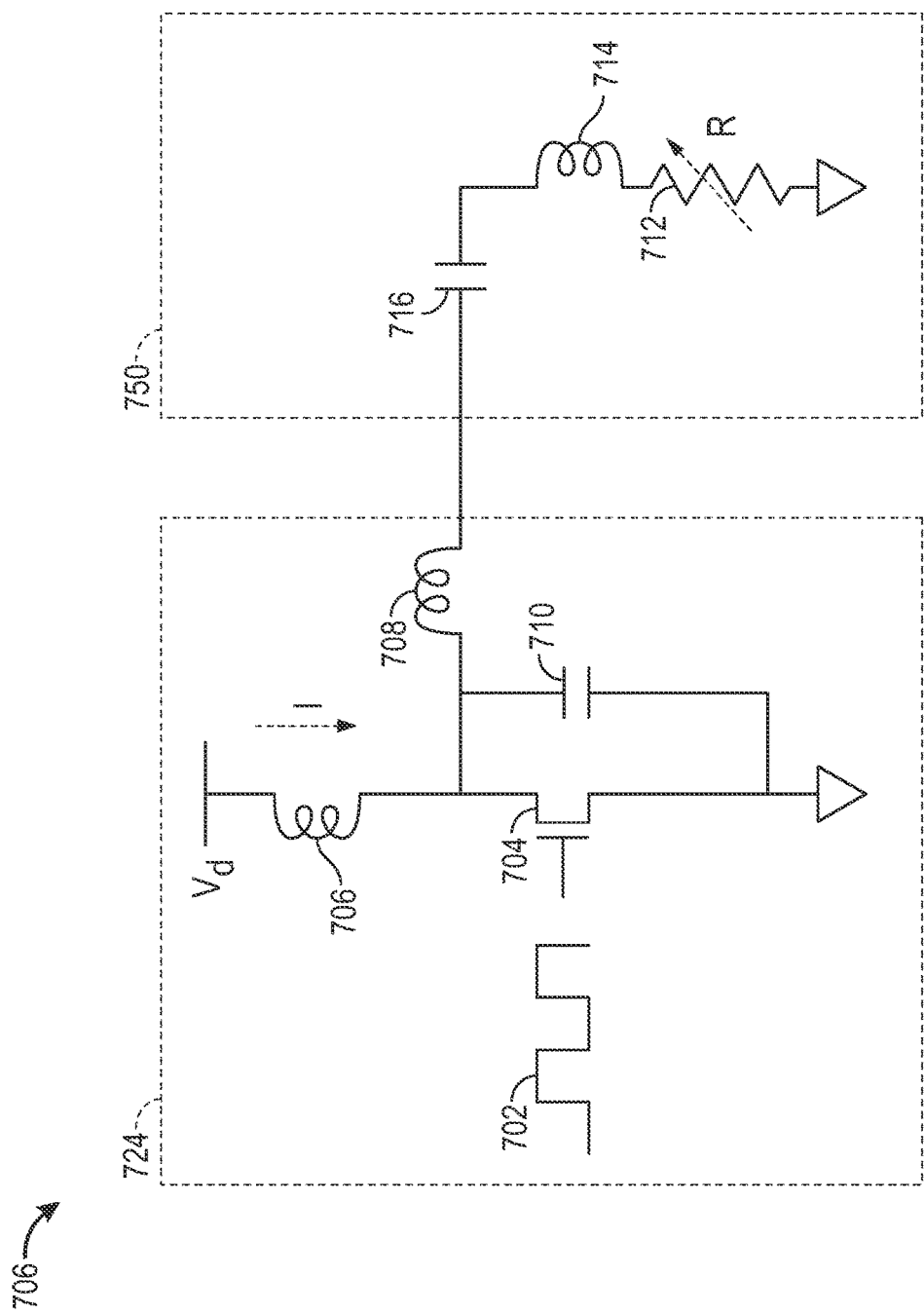
FIG. 7 is a schematic diagram of a driver circuit that may be used in the transmitter of FIG. 6, in accordance with exemplary embodiments of the invention.

The transmit circuit may be driven by a driver circuit. FIG. 7 is a schematic diagram of a driver circuit 724 that may be used in the transmitter 604 of FIG. 6, in accordance with exemplary embodiments of the invention. As stated, the power output and efficiency of the driver circuit (e.g., a driver circuit 424) varies as a function of the load. In some embodiments, the driver circuit 724 may be a switching amplifier. The driver circuit 724 may be configured to receive a square wave and output a sine wave to be provided to the transmit circuit 750. The driver circuit 724 is shown as an ideal (i.e., no internal resistive losses) class E amplifier. The driver circuit 724 includes a switched shunt capacitor 710 and a series inductance 708. $V_D$ is a DC source voltage applied to the driver circuit 724 that controls the maximum power that may be delivered into a series tuned load. The driver circuit 724 is driven by an oscillating input signal 702 to a switch 704.

While the driver circuit 724 is shown as a class E amplifier, embodiments in accordance with the invention may use other types of driving circuits as may be known by those skilled in the art. A driver circuit 724 may be used to efficiently drive a load. The load may be a transmit circuit 750 configured to wirelessly transmit power. The transmit circuit 750 may include a series inductor 714 and capacitor 716 to form a resonant circuit as described above with reference to FIG. 3. While the load is shown as a transmit circuit 750, embodiments in accordance with the invention may be applicable to other loads. As described above with reference to FIG. 6, the load presented to the transmit circuit 750 may be variable due to the number of wireless power receivers 608a, 608b, and 608c and may be represented by a variable resistor 712. The driver circuit 724 may be driven by an input signal 702, such as an oscillator 222 (FIG. 2). As the load presented to the transmit circuit 750 varies, for example, due to a dynamic number of wireless power receivers 638a, 638b, and 638c as described above, the load presented to the driver circuit 724 may also vary likewise.

Figure 8A:
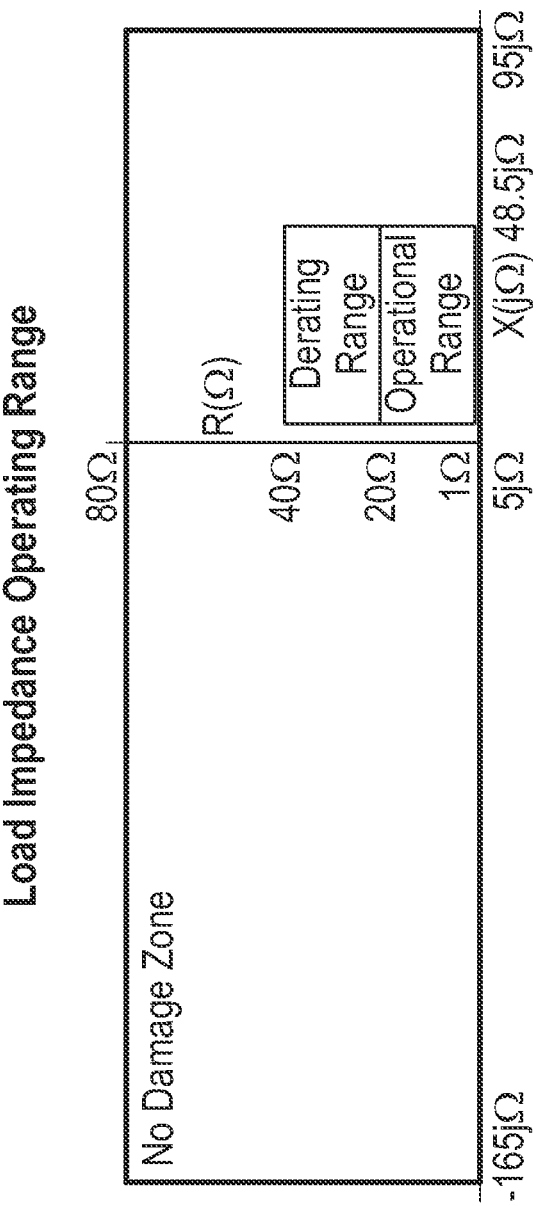
FIG. 8A is a diagram showing an exemplary range of impedances that may be presented to the driver circuit during operation of a wireless power transmitter.

FIG. 8A is a diagram showing an exemplary range of impedances that may be presented to the driver circuit 724 during operation of a wireless power transmit circuit 750. According to one exemplary embodiment, in a "normal" operating mode (shown by the operational range and the derating range), the real load impedance (i.e., resistance) presented to the driver circuit 724 may fall between 1 Ω and 40 Ω. Additionally, in the normal operating mode, the imaginary load impedance (i.e., reactance) may be between 5j Ω and 48.7j. In another embodiment, impedances presented to the driver circuit 724 in an operating range may be from 4 Ω to 40 Ω and between −4j Ω and 50j Ω To supply adequate power, the driver circuit 724 may need to be capable of sourcing 900 mA (milliamps) when the resistance is less than 20 Ω. When the resistance is above 20 Ω, the driver circuit 724 may reduce linearly to be capable of sourcing 600 mA at 40 Ω. Due to, for example, a varying number of wireless power receivers or other factors, the driver circuit 724 may be presented loads with resistances in the 0 to 80 Ω range and reactances from the −165j Ω to 95j Ω as shown in FIG. 8A. It is desirable for the driver circuit 724 to not be damaged by exposure to any load falling within this range. In some cases, to operate in this range, the transmit circuit 750 may be tuned 35j Ω off resonance to bias the load to +35j Ω. Due to reactance changes (e.g., in a range of −22.8j Ω to −17.6j Ω with an average of −20 Ω), a charging device may be charging around 15j Ω subject to variation from component variation. It is desirable to provide efficient and safe operation over all these ranges given various design considerations.

As such, in one aspect, a range of impedance values presented to the driver circuit 724 may be defined by complex impedance values including real impedance values and imaginary impedance values. The real impedance values may be defined or characterized by a ratio between a first real impedance values to a second real impedance value. The ratio could be one of 2 to 1, 5 to 1, and 10 to 1. For example, the range of real impedance values presented to the driver circuit 724 could be between 8 Ω and 80 Ω (a ratio of 10:1). In another embodiment, the range could be between 4 Ω and 40 Ω (also a ratio of 10:1). In addition, the range of impedance values presented to the driver circuit 724 may be further defined by a range of imaginary impedance values. The range of the imaginary impedance values may be defined as a ratio of the magnitude of the imaginary impedance values (i.e., magnitude between minimum and maximum imaginary impedance values) to a magnitude of the real impedance values. For example, a magnitude of the real impedance values could be the magnitude of the difference between a first real impedance value and a second real impedance value. The ratio of the magnitude of the imaginary impedance values to the magnitude of the real impedance values may be at least one of 1:2, 2:1, 1:1, 2:3 etc. For example, if a real impedance range is between 8 Ω and 80 Ω, a magnitude may be 72 Ω. As such, if the ratio of the magnitude of the imaginary impedance values to the magnitude of the real impedance values is 2 to 1, then the range of imaginary impedance values may be 144 (i.e., a range from −4j Ω to 140 Ω). In any event, it is desirable to provide efficiency and safe operation over a range of complex impedance values that may be defined according to various methods.

Figure 8B:
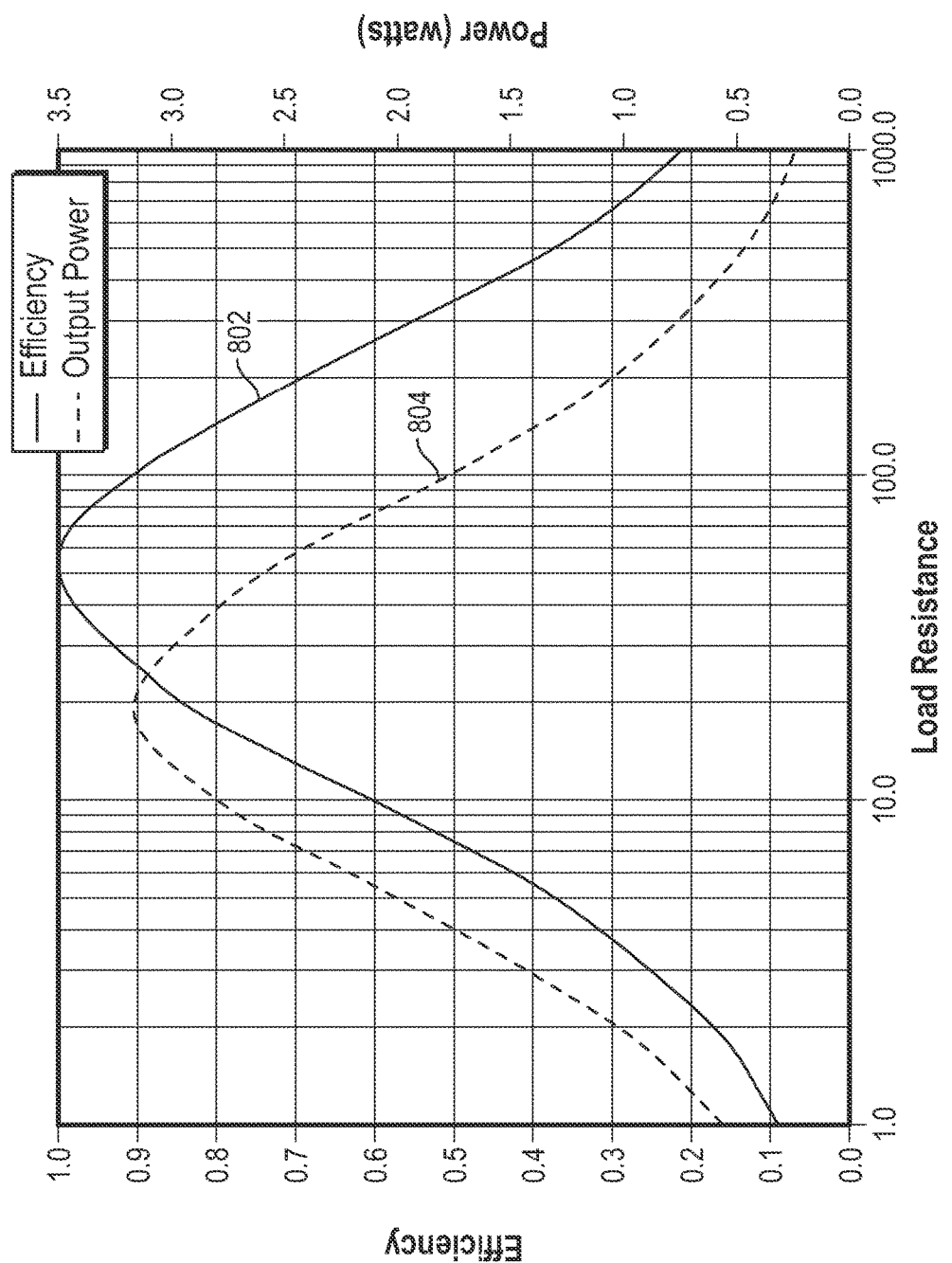
FIG. 8B is a plot showing efficiency and output power of the driver circuit of FIG. 7 as a function of the real impedance of a load of a driver circuit.

As described above, the power and efficiency of a driver circuit 724 are a function of the load the driver circuit 724 is driving. FIG. 8B is a plot showing efficiency 802 and output power 804 of the driver circuit 724 of FIG. 7 as a function of the real impedance of a load (i.e., load resistance) of the driver circuit 724. As shown in FIG. 8, 100% (or maximum) efficiency at a single real load impedance value may exist (e.g., 50 Ω as shown in FIG. 8) for an ideal class E amplifier. The efficiency 802 decreases as the load impedance varies in either direction. FIG. 8 also shows that the total output power 804 is similarly a function of the load impedance and which peaks at particular load impedance value (e.g., 20 Ω). Similar results are described in Raab, "Effects of Circuit Variations on the class E Tuned Power Amplifier" (IEEE Journal of Solid State Circuits, Vol. SC-13, No. 2, 1978).

If the driver circuit 724 drives a load with a constant impedance, then the driver circuit 724 may be ideally designed (e.g., values of the capacitor 710 and inductor 708, etc. may be chosen) such that the driver circuit 724 operates at maximum efficiency. For example, by using the values in the plot in FIG. 8B, if the driver circuit 724 is configured to drive a load with an unvarying impedance that is substantially equal to 50 Ω, the driver circuit 724 may drive the load at a maximum efficiency level. However, if the load of the driver circuit 724 varies, then the average efficiency and power delivered by the driver circuit 724 may be significantly lower than its maximum efficiency or maximum power as shown in FIG. 8. Furthermore, as the impedance of the load increases, the power delivered may not increase.

As shown in FIG. 7 and as described above, the load driven by the driver circuit 724 may be a wireless power transmit circuit 750. The load presented to the transmit circuit 750, given a varying number of wireless power receivers 608a, 608b, 608c (FIG. 6), may thus vary the load seen by the driver circuit 724. In this case, the total load impedance presented to the transmit circuit 750 may be the sum of each of the load impedances presented by each wireless power receiver 608a, 608b, 608c as they may combine in series. Ideally, the driver circuit 724 would provide maximum efficiency over all loads while having the power increase linearly as the resistance of the load increases. Power would then be divided among the loads. However, as seen in FIG. 8B, maximum efficiency for the driver circuit 724 may occur for a single real load impedance value.

Figure 9:
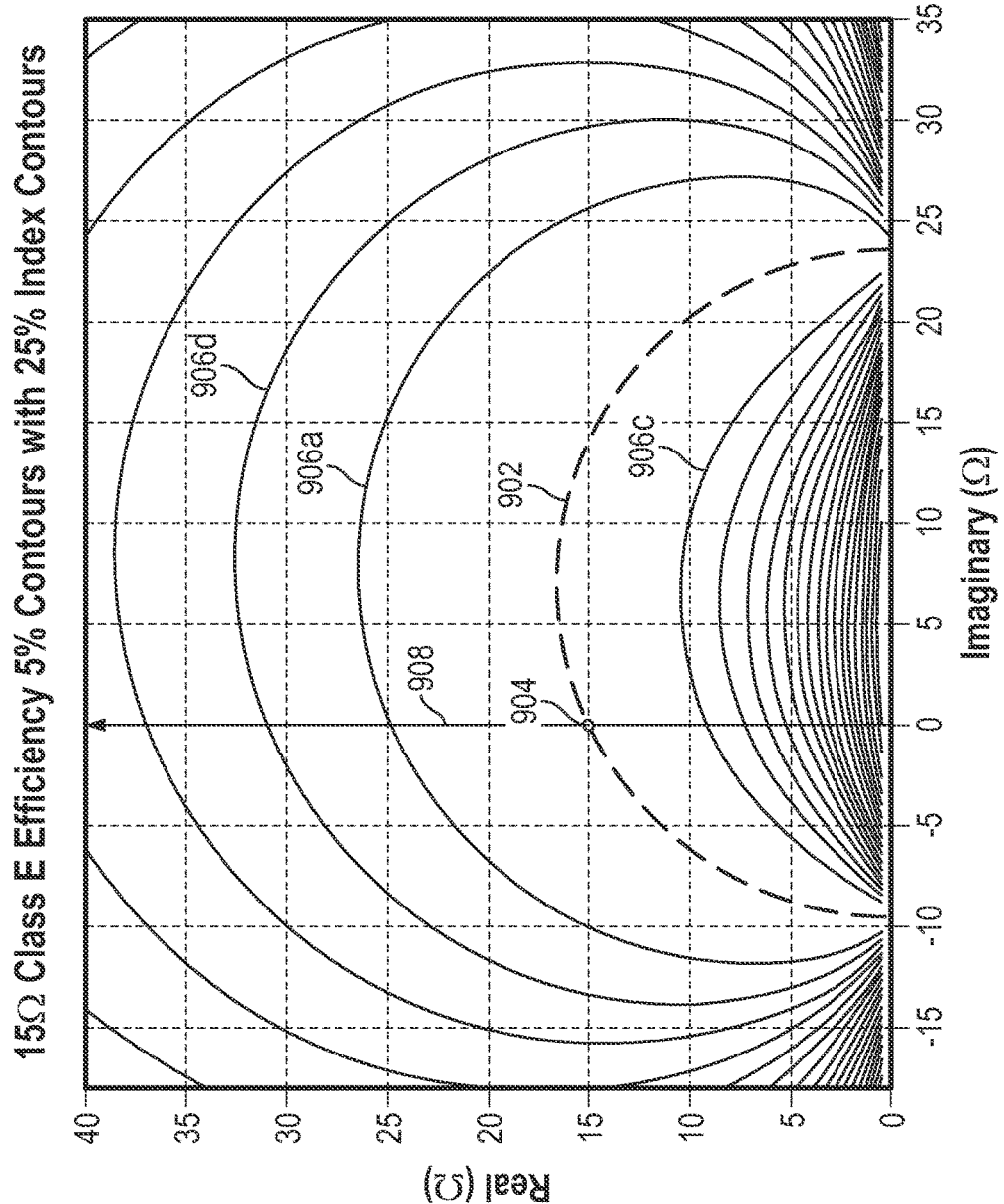
FIG. 9 is a contour plot showing the efficiency of a driver circuit as in FIG. 7 as a function of the real and imaginary components of the load impedance presented to the driver circuit.

One aspect of exemplary embodiments are directed to achieving high efficiency of the driver circuit 724 as the real load impedance varies while also increasing power as the load resistance increases. In one aspect, this may allow for efficient wireless power transfer for a variable number of wireless power receivers 608a, 608b, and 608c. To provide improved efficiency of a variety of loads, the efficiency of a class E amplifier 724 is analyzed over variations in both a real component of the load impedance (i.e., resistance) and the imaginary component of the load (i.e., reactance). FIG. 9 is a contour plot showing the efficiency of a driver circuit 724 as in FIG. 7 as a function of the real and imaginary components of the load impedance presented to the driver circuit 724. The plot may correspond to a driver circuit 724 that is designed to have a maximum efficiency for a load with a resistance of 15 Ω and a reactance of 0 Ω with a drive voltage of 15 V. The complex load plot of FIG. 9 shows efficiency contours 906a, 906b, and 906c at increments of 5%. For example, points along the contour 906a may represent the combinations of resistance and reactance values that correspond to a load for which the class E amplifier is 95%. The contour 902 corresponds to load impedance values that correspond to an efficiency 100%.

The results of the plot shown in FIG. 8B may be seen in FIG. 9 by holding the reactance at zero and varying the resistance from 0 to 40 Ω as shown by the arrow 908. The path 908 passes through the point 904 with a value of 15 Ω+j0 Ω where efficiency is 100%. The contour 902 shows that there is a path (e.g., a range of impedances) at which efficiency is 100%. As such, rather than just analyzing efficiency over real impedance values only, analyzing efficiency for both real and imaginary impedance values (i.e., a range of resistance and reactance values) shows that there is a range of complex impedance values for which efficiency of the driver circuit 724 is 100%.

Figure 10:
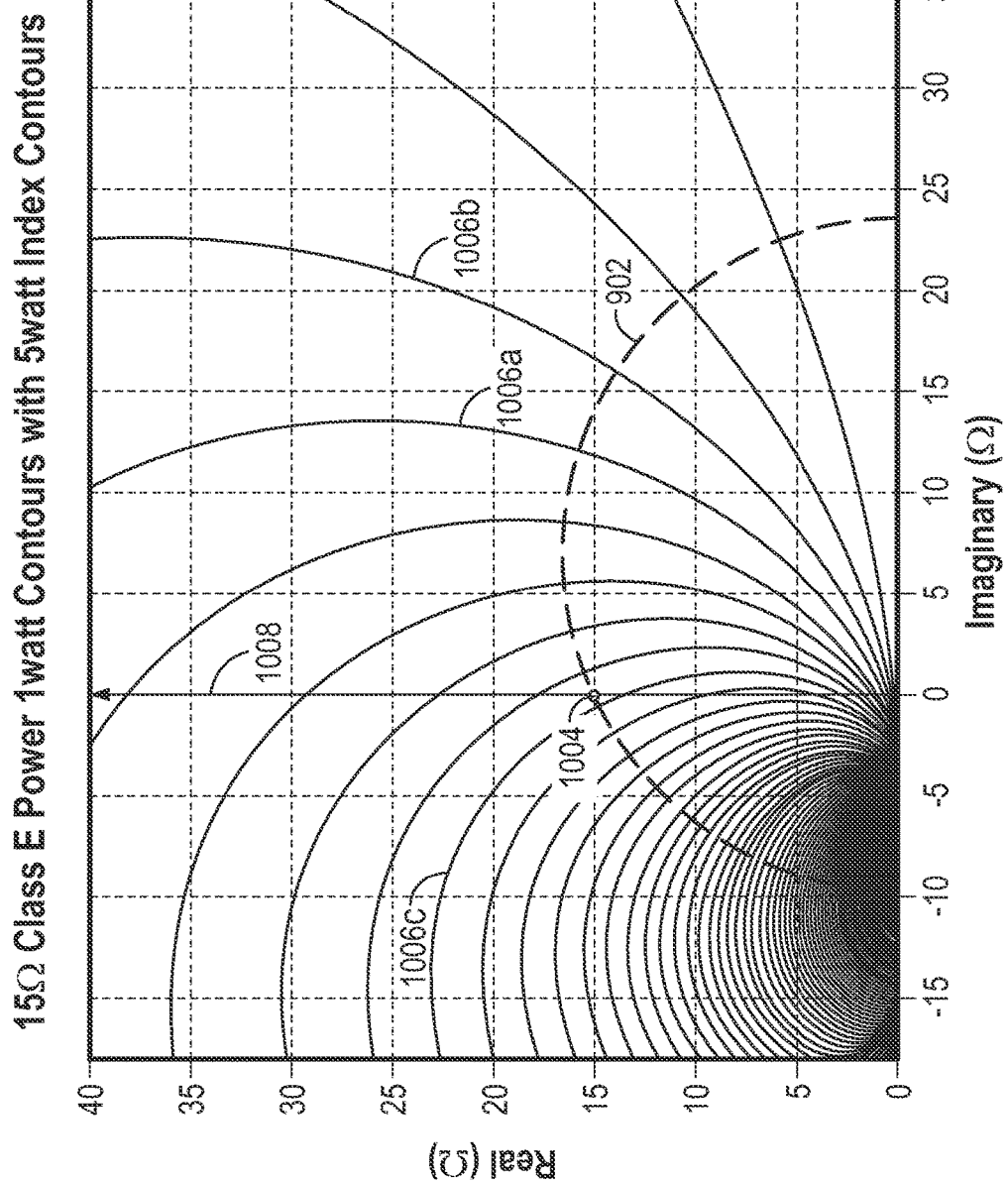
FIG. 10 is a contour plot showing the power output of a driver circuit as in FIG. 7 as a function of real and imaginary components of the load impedance presented to the driver circuit.

FIG. 10 is a contour plot showing the power output of a driver circuit 724 as in FIG. 7 as a function of real and imaginary components of the load impedance presented to the driver circuit 724. The complex load plot of FIG. 10 shows power contours 1006a, 1006b, and 1006c at 1 watt increments. For example, points along the contour 1006b may represent combinations of resistance values and reactance values that represent an impedance value at which 5 watts of power may be delivered. Points along the contour 1006c may represent combinations of resistance values and reactance values that represent an impedance value at which 10 watts of power may be delivered. The results of the plot shown in FIG. 8B may be seen by holding the reactance at zero and varying the resistance from 0 Ω to 40 Ω as shown by the arrow 1008. The path 1008 passes through the point 1004 where efficiency (shown by the contour 902 from FIG. 9) is 100% and power delivered is a little over 6 Watts. The 100% efficiency contour 902 of FIG. 9 placed in the plot of FIG. 10 shows that there is path 902 where efficiency is 100% and where the power continually increases as shown as the contours represent increasing power. As shown in FIGS. 9 and 10, the 100% efficiency path 902 starts at an impedance of j24 Ω, passes through 15+j0 Ω and continues to −j10 Ω.

Certain aspects of exemplary embodiments are directed to using the results of FIGS. 9 and 10 to design the wireless power transmitter 604 such that load impedance values presented to the driver circuit 724 correspond to complex values for which the driver circuit 724 is highly efficient as the load varies. This may allow for a driver circuit 724 in a wireless power transmitter 604 to efficiently provide power as the load presented to the driver circuit 724 varies due to a dynamic number of wireless power receivers 608a, 608b, and 608c (FIG. 6).

Figure 11:
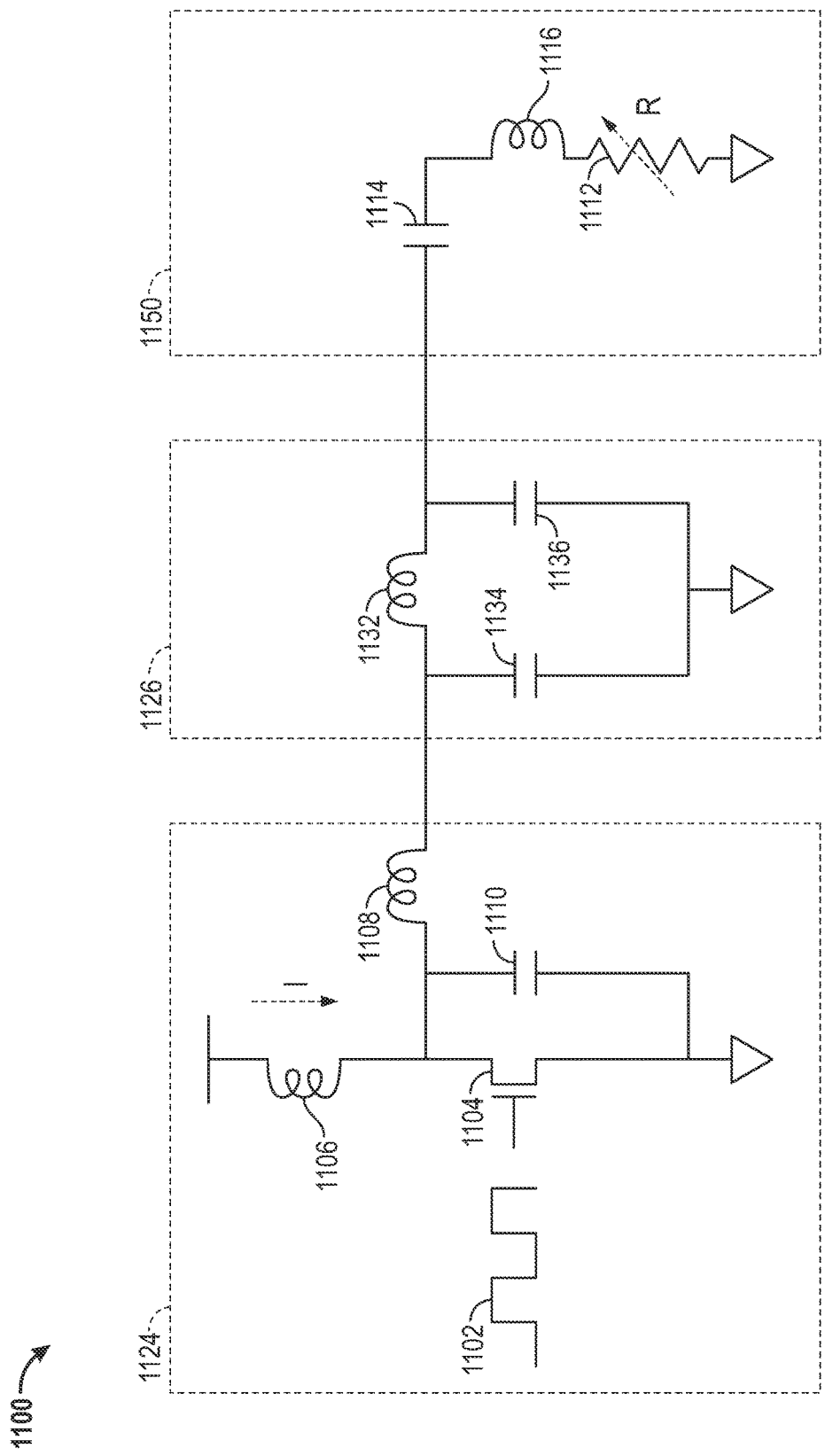
FIG. 11 is a schematic diagram of a driver circuit as in FIG. 7 including a filter circuit, in accordance with exemplary embodiments of the invention.

In one embodiment, a filter circuit may be used to transform a load impedance of a transmit circuit 750 into complex load values for which the driver circuit 724 may be highly efficient. FIG. 11 is a schematic diagram of a driver circuit 1124 as in FIG. 7 including a filter circuit 1126, in accordance with exemplary embodiments of the invention. A driver circuit 1124 may generate harmonics of 6.78 MHz, when the operating frequency of the driver circuits 1124 is substantially 6.78 MHz. For various reasons, including for meeting regulatory requirements, a filter circuit 1126 may be included to remove unwanted harmonics produced by the driver circuit 1124. For example, the filter circuit 1126 may be a three pole (C 1134, L 1132, C 1136) low pass filter configured to remove harmonics. By using information derived from the plots such as FIGS. 9 and 10, a filter circuit 1126 may be designed to meet spectral emission mask requirements (via reducing harmonics), ensure that the load impedance at which maximum power may be delivered is above the load at which maximum efficiency is achieved, and expand the range of load impedance values for which the driver circuit 1124 is highly efficient.

For example, the filter circuit 1126 may be chosen such that the varying impedance of the transmit circuit 1150 (due to receivers 608*a*, 608*b*, and 608*c*) is transformed by the filter circuit 1126. The transformed impedance values may correspond to impedance values (such as those as shown in FIGS. 9 and 10) that provide highly efficient driver circuit 1124 operation. The design parameters of the filter circuit 1126 may be chosen to perform an impedance transform that transforms the impedance of the load 1112 seen by the transmit coil 1150 into a complex impedance that fits as closely as possible to complex values that provide high efficiency such as those values along the high efficiency path 902 shown in FIG. 9. In some embodiments as will be further described below, an additional reactive component (e.g., such as the selection of the series inductance 1108 of the driver circuit 1124) may be used in conjunction with the filter circuit 1126 to shift the impedance transformation performed by the filter circuit 1126 to match as closely as possible to complex values that provide high efficiency such as those values along the efficiently path 902.

As such, in one exemplary embodiment, the filter circuit 1126 may be configured to modify the impedance presented to the filter circuit 1126 (e.g., the impedance of the transmit circuit 1150 due to a variable number of receivers 608*a*, 608*b*, and 608*c*) to maintain the efficiency of a driver circuit 1124 at a level that is within 20% of a maximum efficiency of the driver circuit 1124. In another embodiment, efficiency may be maintained at a level that is within 10% or lower of a maximum efficiency of the driver circuit 1124. The filter circuit 1126 may be referred to as or be configured as an impedance transformation network. The range of impedance values presented to the filter circuit 1126 that are transformed by the filter circuit 1126 may be characterized by a range of complex impedance values. The range of complex impedance values may be within a range defined by a first real impedance value and a second real impedance value, where a ratio between the first real impedance value to the second real impedance value is at least two to one. For example, the range of real impedance values may be substantially between 8 Ω and 80 Ω or 4 Ω and 40 Ω having a ratio of 10 to 1. The first real impedance value and the second real impedance value may define approximate minimum and maximum real impedance values.

In addition, the range of complex impedance values may further be defined as within a range defined by a first imaginary impedance value and a second imaginary impedance value. The first imaginary impedance value and the second imaginary impedance value may define approximate minimum and maximum imaginary impedance values. The range of imaginary impedance values (i.e., the magnitude of the difference between the first imaginary impedance value and the second imaginary impedance value) may be defined by a ratio of the magnitude of the imaginary impedance value to the magnitude of the real impedance value (e.g., equal to a magnitude of the difference between the first real impedance value and the second real impedance value). The ratio may be at least one of 1:2, 2:1, 1:1, 2:3, 3:2, etc. For example, if the magnitude of the real impedance values is 72 Ω, and the ratio is 2:1, the range of imaginary impedance values may be 144 Ω (e.g., a range of a minimum to a maximum). In another example, in one embodiment, the first real impedance value may be substantially 4 Ω, the second real impedance value may be substantially 40 Ω, the first imaginary impedance value may be substantially −4 Ω, and the second imaginary impedance value may be substantially 50 Ω. A wide range of complex impedance values may be presented to the filter circuit 1126 given the design parameters and the potential number of receivers. As such, ranges and ratios contemplated by various exemplary embodiments described herein may substantially vary from the specific examples provided herein.

According to certain embodiments, a passive or fixed filter circuit 1126 (i.e., substantially all of the components of the filter circuit 1126 may be passive circuit elements) as shown in FIG. 11 may be provided. As such, the filter circuit 1125 may not require control signals or other dynamic logic to control or configure the circuit as the load changes during operation. This may reduce cost and complexity and may provide other benefits as will be appreciated by one/those skilled in the art.

Figure 12:
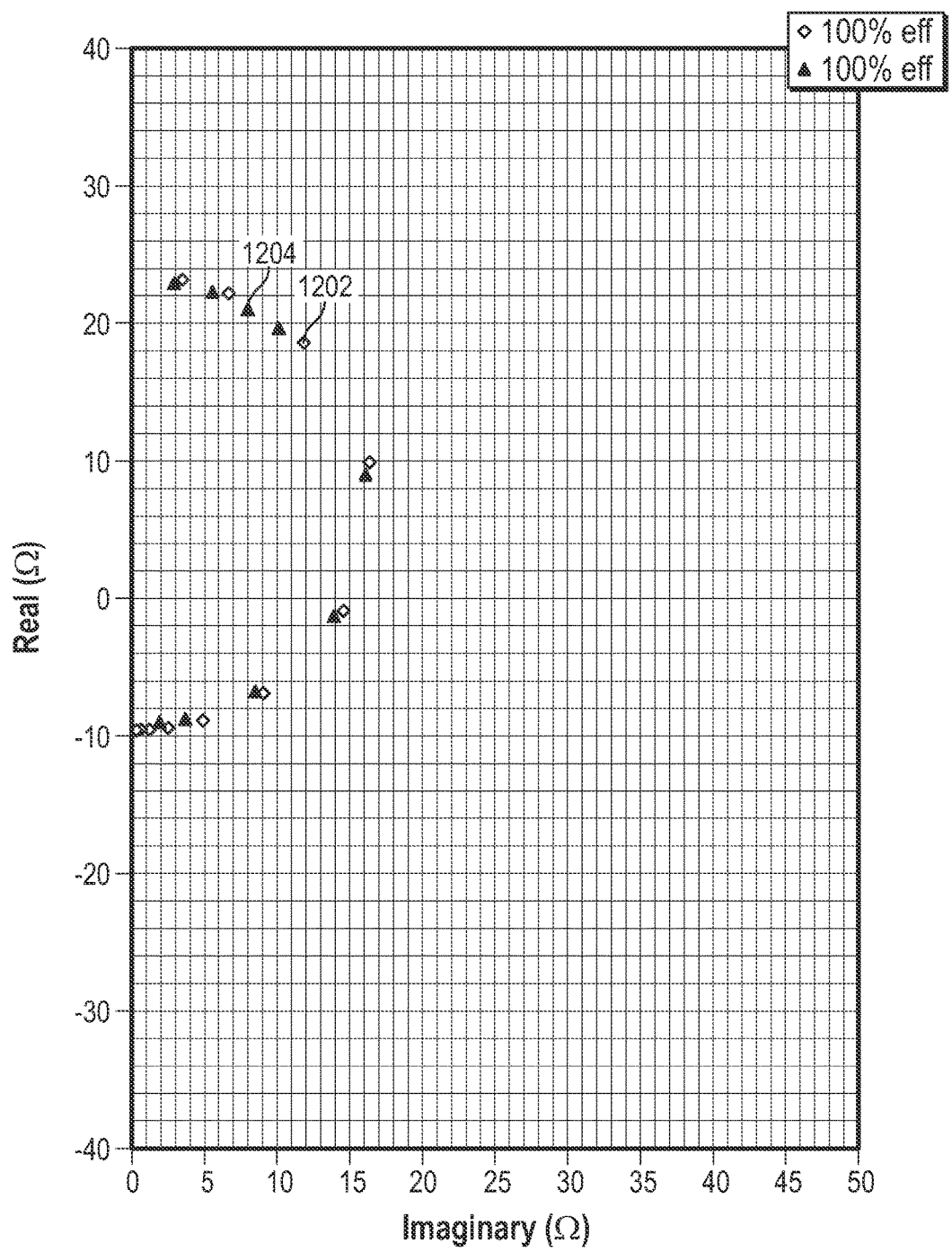
FIG. 12 is a complex impedance plot of the efficiency of a driver circuit using an exemplary filter circuit as shown in FIG. 11

In one embodiment, the filter circuit 1126 may be a 3 pole, 15 Ω Butterworth filter with a 3 dB bandwidth of 0.93 times the operating frequency. FIG. 12 is a complex impedance plot of the efficiency of a driver circuit 1124 using an exemplary filter circuit 1126 as shown in FIG. 11 that may correspond to a Butterworth filter as just described. The points 1202 define a path corresponding to reactance versus resistance values of the 100% efficiency contour 902 of FIG. 9. The points 1204 define a path corresponding to reactance versus resistance values as seen at the input to the filter circuit 1126 that may be the 3 pole 15 Ω Butterworth filter. As shown in FIG. 12, the two paths 1202 and 1204 are nearly identical showing that the filter circuit 1126 may transform the varying impedance of the transmit circuit 1150 into an impedance value for which the driver circuit 1124 is near maximum efficiency.

Figure 13A:
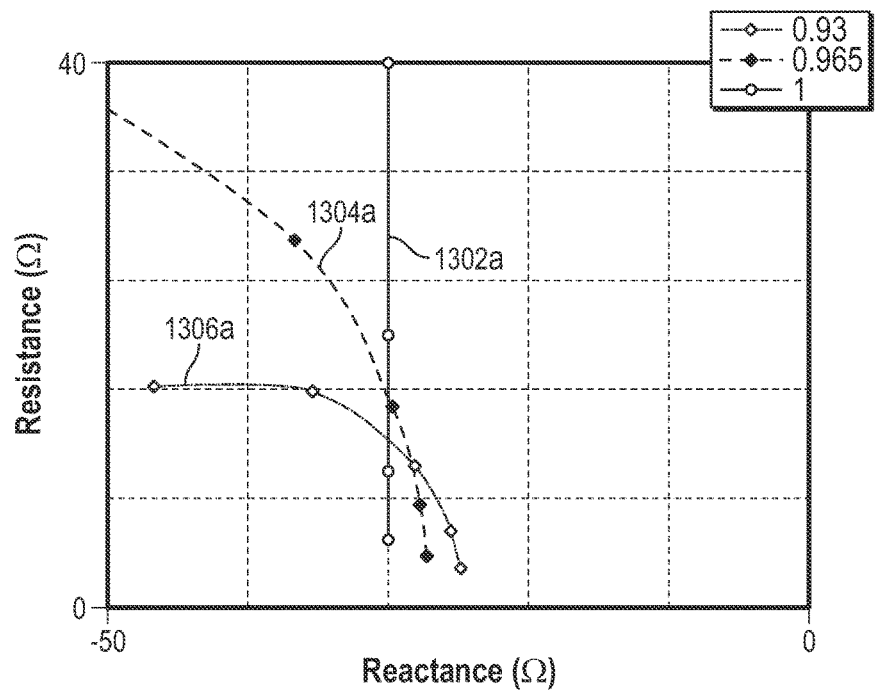
FIGS. 13A, 13B, and 13C are complex impedance plots showing an impedance transform of the impedance of a transmit circuit using three different low pass filter designs, in accordance with exemplary embodiments of the invention.
Figure 13B:
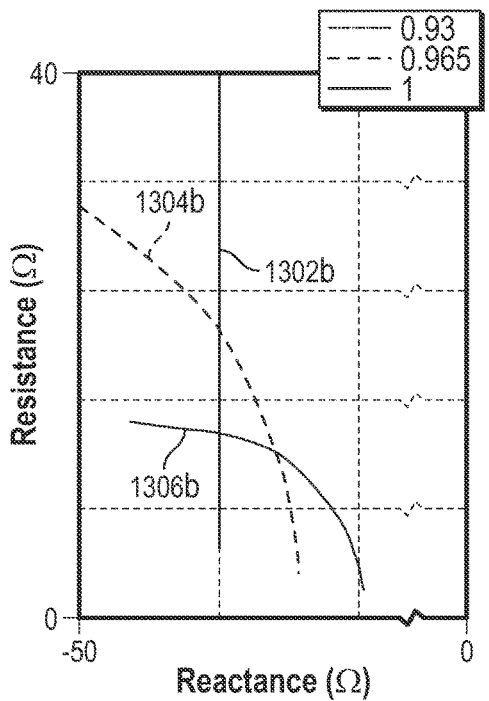
Figure 13C:
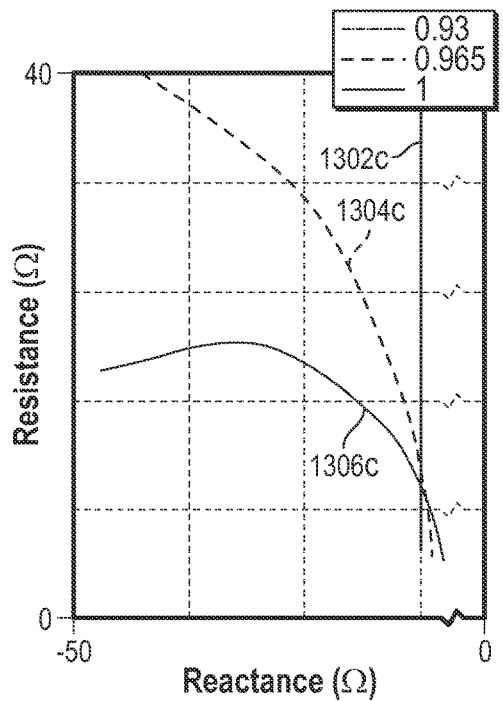

FIGS. 13A, 13B, and 13C are complex impedance plots showing an impedance transform of the impedance of a transmit circuit 1150 using three different low pass filter designs, in accordance with exemplary embodiments of the invention. The curves 1302*a*, 1302*b*, and 1302*c* correspond to a first filter design that has a 3 dB bandwidth of 6.78 MHz. This may result in a 1:1 transform of the impedance (i.e., no change in impedance). This may correspond to a purely resistive load and the efficiency of a driver circuit 1126 may be correspond to the results as shown in FIG. 8. The paths 1304*a*, 1304*b*, and 1304*c* correspond to a second filter with a bandwidth of 0.965 times 6.78 MHz. The paths 1304*a*, 1304*b*, and 1304*c* correspond to a third filter with a bandwidth of 0.93 time 6.78 MHz. The second and third filters cause the impedance of the transmit circuit 1150 to rotate counter clockwise as shown in FIGS. 13A, 13B, and 13C. The transformation allows the impedance of the driver circuit 1124 to remain within the high efficiency region shown in FIG. 9 while also increasing power as the load increases as shown in FIG. 10.

FIG. 13A shows an impedance transform 1302*a* when the impedance is real (i.e., no reactive component) where the resistances vary from 5 Ω to 80 Ω while the reactance is 0. The points correspond to resistances of 5, 10, 20, 40, and 80 Ω. The two filter impedance transformations 1304*a* and 1306*a* provide transformations that start to approximate the efficiency contour 902 of FIG. 9. FIG. 13B shows the impedance transform with a −10j reactance offset to account for situations where the impedance presented to the transmit circuit 1150 may not be purely resistive. FIG. 13C shows the impedance transform with a +10j reactance offset. The plots show how different filter designs may be used to transform the impedance to an impedance for which the efficiency of the driver circuit 1124 may be maintained high while the impedance of the transmit circuit 1150 varies. In some cases, a series inductance with a positive reactance may be added to shift the results into an optimum range.

Figure 14:
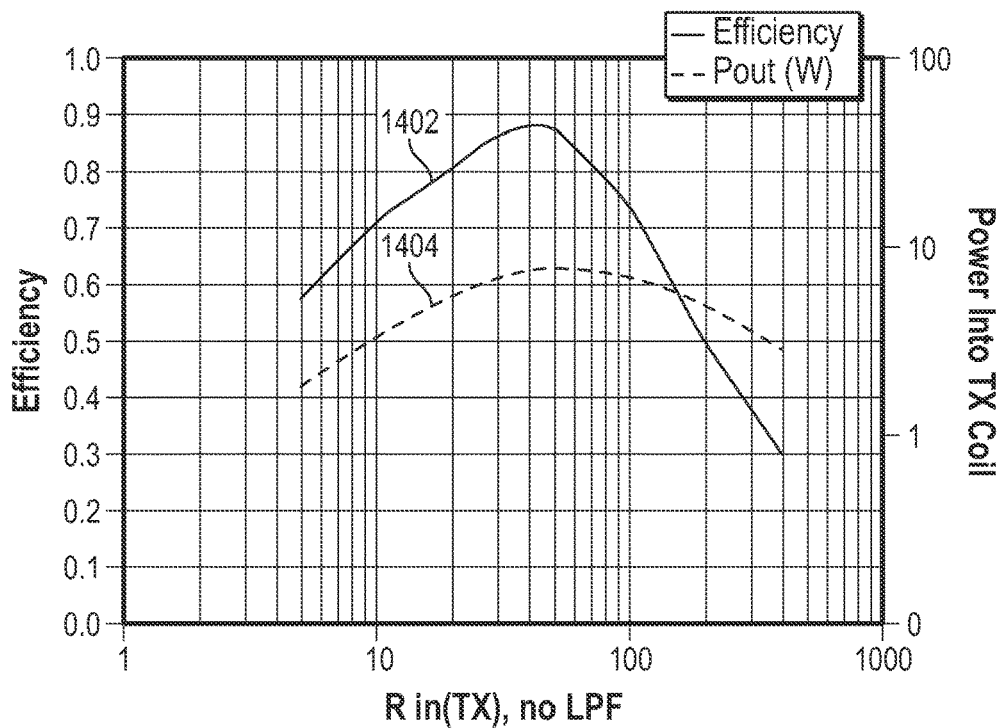
FIG. 14 is a plot showing efficiency and output power of a driver circuit as in FIG. 11 as a function of the real impedance of a transmit circuit without using a filter circuit.
Figure 15:
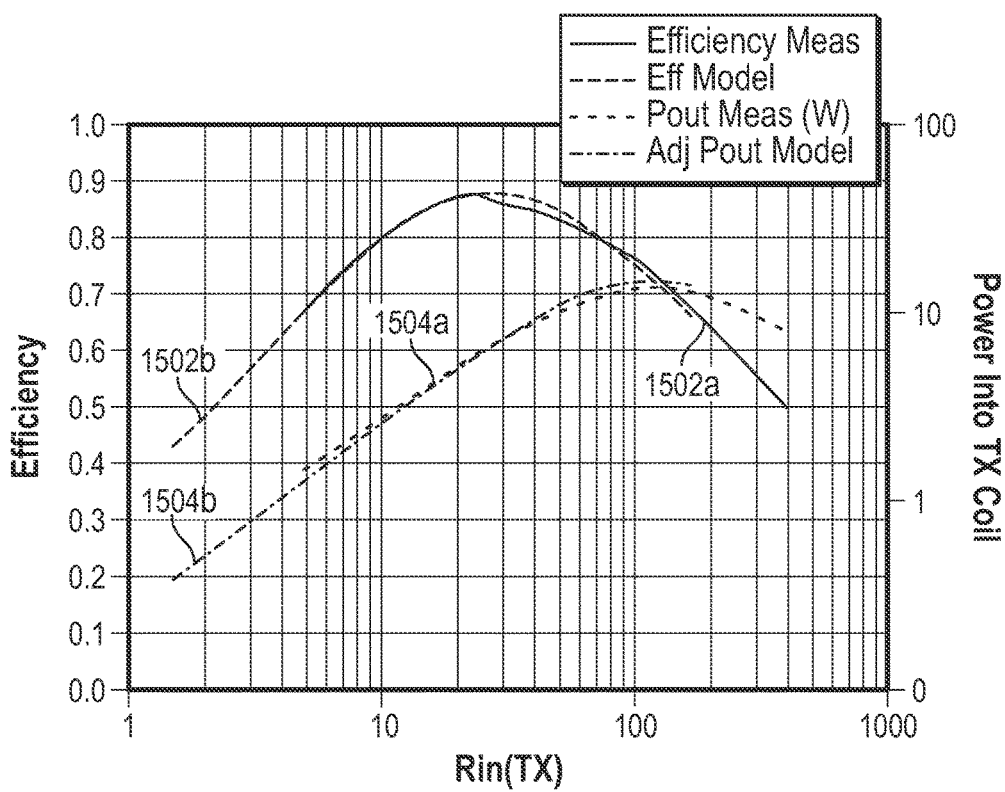
FIG. 15 is a plot showing efficiency and output power of a driver circuit as in FIG. 11 as a function of real the impedance of a transmit circuit when using a filter circuit.

The results described above may reflect ideal results that may not take into account losses in the driver circuit 1124 and low pass filter. FIGS. 14 and 15 below show efficiency and power outputs of a driver circuit 1124 that may reflect a portion of these losses. FIG. 14 is a plot showing efficiency 1402 and output power 1404 of a driver circuit 1124 as in FIG. 11 as a function of the real impedance presented by a transmit circuit 1150 without using a filter circuit 1126. As shown, driver circuit losses reduce the maximum efficiency of the range, but still provide a range in efficiency like that shown in FIG. 8. For example, the range of load impedances where efficiency is reduced to 10% from its maximum efficiency in FIG. 8 is from 28 Ω to 100 Ω, while in FIG. 14 this range is from about 20 Ω to 75 Ω. Furthermore, as in FIG. 8, there is an impedance at which output power 1404 is maximum that decreases as the impedance varies in either direction.

FIG. 15 is a plot showing efficiency 1502a and 1502b and output power 1504a and 1504b of a driver circuit 1124 as in FIG. 11 as a function of the real impedance presented by a transmit circuit 1150 when using a filter circuit 1126. FIG. 15 shows both the measured efficiency results 1502a and modeled efficiency results 1502b for the driver circuit 1124 for a designed filter as described above with reference to FIG. 11 that maximizes an efficiency of the driver circuit 1124. FIG. 15 also shows the measured power output results 1504a and the modeled power output results 1504b. As shown in FIG. 15, the range of loads at which the power driver circuit 1126 is within 10% of maximum efficiency is increased to be approximately 8 Ω to 80 Ω (i.e., 10:1) as compared to FIG. 14. In addition to increasing the efficiency load range, the maximum power point (i.e., impedance at which maximum power is output) is increased from about 50 Ω to 110 Ω. This may be sufficient to supply a power demand of several (e.g., four) receivers. Furthermore, as shown in FIG. 15, the power increases generally linearly with the load and up to 30 watts of power may be supplied by adjusting the control voltage on the driver circuit 1124.

Figure 16A:
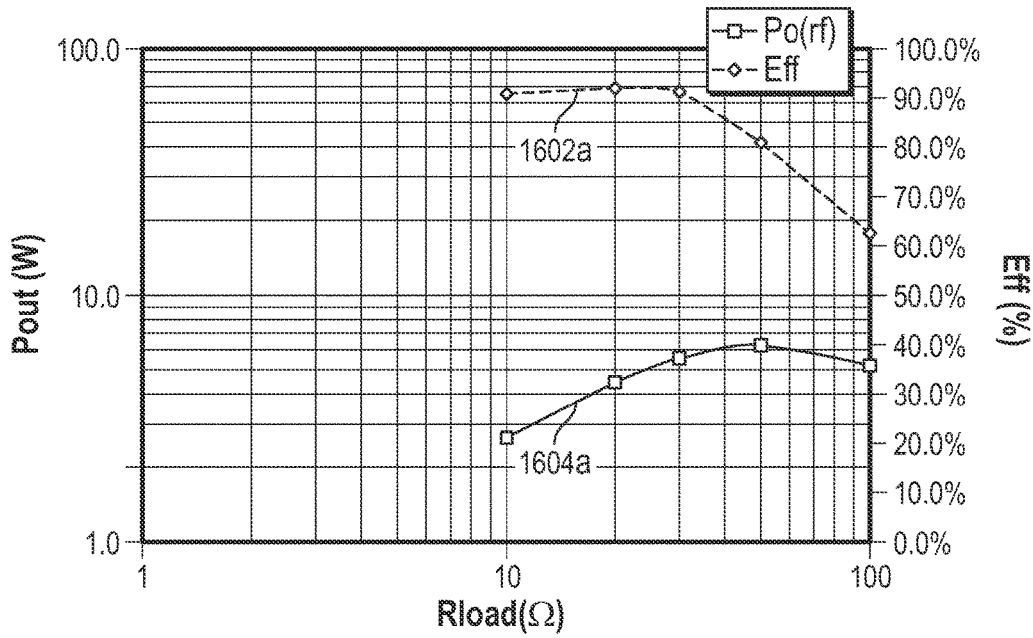
FIGS. 16A, 16B, 16C, and 16D are load plots of the efficiency and power output of a driver circuit as in FIG. 11 as function of the real impedance of a load using four different filter circuit designs.
Figure 16B:
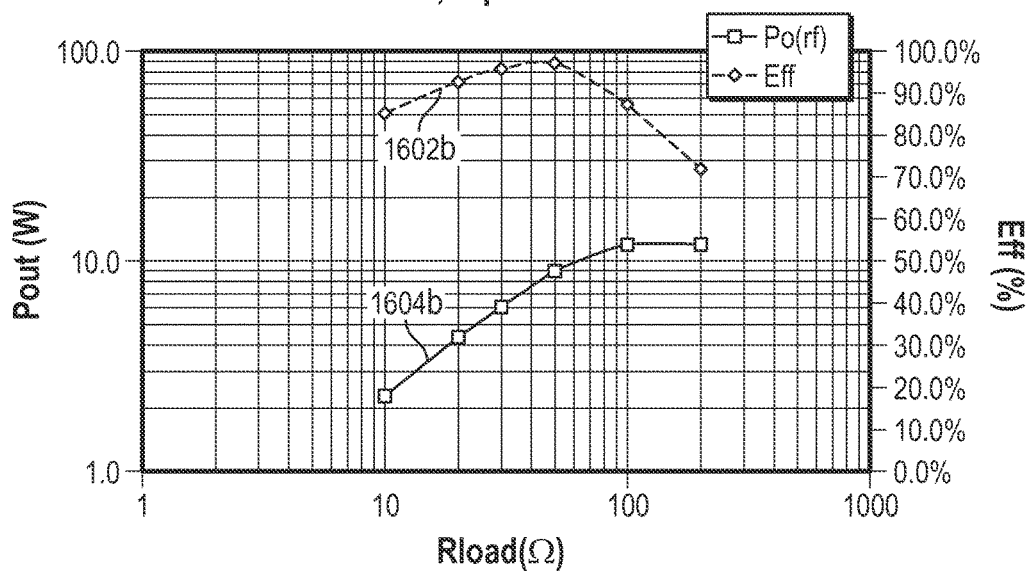
Figure 16C:
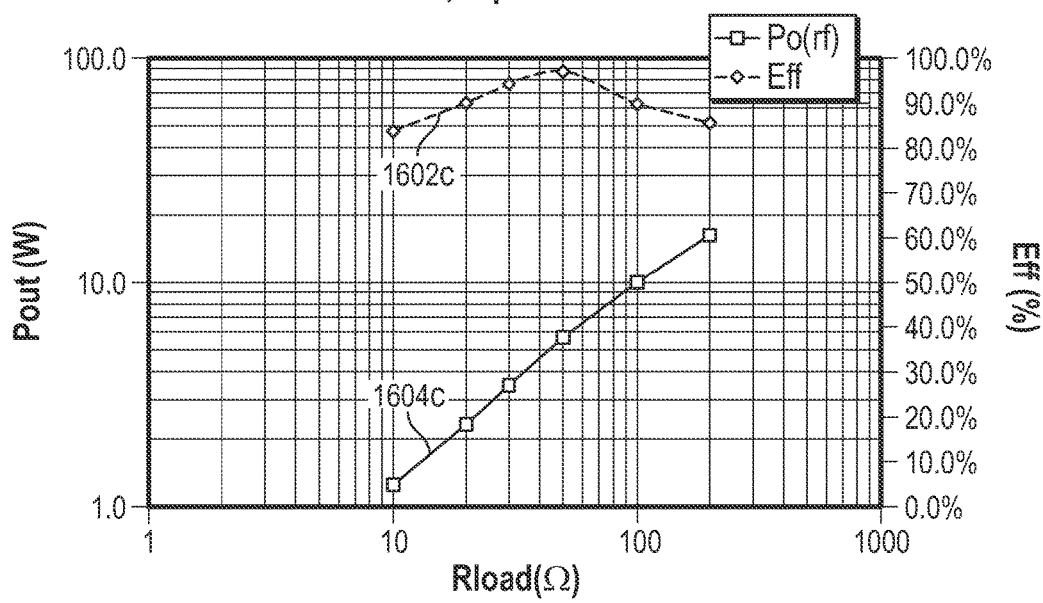
Figure 16D:
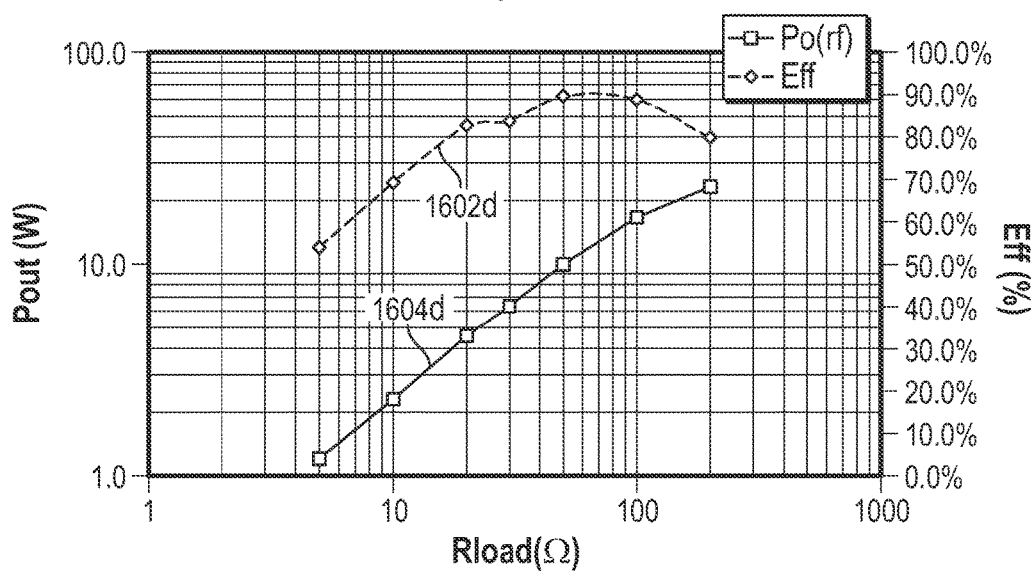

As additional examples, FIGS. 16A, 16B, 16C, and 16D are load plots of the efficiency and power output of a driver circuit 1124 as in FIG. 11 as function of the real impedance of a load using four different filter circuit designs. FIG. 16A shows the power and efficiency of a driver circuit 1124 for a particular driver circuit configuration and filter circuit 1126 design with a capacitance of 1640 pF and an inductance of 640 nH. As shown in FIG. 16A, the driver circuit 1124 maintains a high efficiency level from approximately 10 Ω to 30 Ω while power increases in this range. FIG. 16B shows the power and efficiency of a driver circuit 1124 for a particular driver circuit configuration and filter circuit 1126 design with an inductance of 710 nH. As shown in FIG. 16B, the driver circuit 1124 is at least 95% efficient from approximately 10 Ω to 100 Ω while power increases in a range of 10 Ω to 100 Ω. FIG. 16C shows the power and efficiency of a driver circuit 1124 for a particular driver circuit configuration and filter circuit 1126 design with an inductance of 757 nH. As shown in FIG. 16C, the driver circuit 1124 maintains a high efficiency level from approximately 10 Ω to 100 Ω while power increases in a range of 10 Ω to 200 Ω. FIG. 16D shows the power and efficiency of a driver circuit 1124 for a particular driver circuit configuration and filter circuit 1126 design with an inductance of 757 nH. As shown in FIG. 16D, the driver circuit 1124 maintains a high efficiency level from approximately 30 Ω to 100 Ω while power increases in a range of 10 Ω to 200 Ω. These plots demonstrate the variety of different design choices that may be made to choose a filter circuit 1126 design that optimizes a driver circuit 1124 efficiency over a range of loads, in accordance with exemplary embodiments of the invention. Different filter circuit 1126 designs may be chosen for different driver circuit 1126 configurations.

To design the filter circuit 1126, the particular driver circuit 1124 used may be tested to determine all complex impedance values for which the driver circuit 1124 operates at substantially maximum efficiency. Then through testing and simulation, a filter circuit 1126 design is chosen that transforms the variable impedance seen at a load to impedances that are correlated with the values for which the driver circuit 1124 is highly efficient. An additional impedance shifting element (e.g., the series inductance) may be used to shift the impedances transformed by the filter circuit 1126 to match the impedances for which the driver circuit 1124 is highly efficient. It should be appreciated that characteristics described herein are merely exemplary and there may be a range of filter designs that may provide the desired impedance transform.

Several design characteristics may be used to select the driver circuit 1124 components, the filter circuit 1126 components, and an impedance adjustment element (e.g., the series inductance 1108) such that the driver circuit 1124 is highly efficient when presented with a wide range of real impedance values. One characteristic is the operating frequency that sets the frequency of the driver circuit 1124 and determines the relationship between values and impedance of the components used.

Design characteristics of the driver circuit 1124 that may be used to achieve high efficiency may include the driver circuit characteristic impedance, input voltage, and series reactance. The characteristic impedance may linearly scale the radius of the high efficiency line 902 (FIG. 9) described above. The input voltage may scale the output power, but may not affect the high efficiency line 902. Although the series reactance may be used, in some cases it may be less desirable for use as a selectable parameter, as it may be derived from the operating frequency and the characteristic impedance. However, there may be added an additional series reactance in series with the inherent series reactance of the driver circuit 1124. One configuration that may be used includes a series inductor and capacitor and whose total reactance is determined by the parameters above. In another configuration, the series reactance may be effectively removed and the additional series reactance may be relied upon. The selection of the position of the series capacitor may also be used to achieve a desired high efficiency curve 902. An additional series reactance at the operating frequency may be used to shift the relative reactance of the driver circuit high efficiency line 902 to a load curve resulting from the impedance transformation of the filter circuit 1126.

In addition, a variety of characteristics of the filter circuit 1126 may be chosen to arrive at a desired impedance transformation that may be correlated with the high efficiency curve 902. Characteristics of the filter circuit 1126 may include the number of desired poles, the type of filter circuit, or a number of stacked filter circuits. The filter circuit 1126 may be a ladder network of reactive elements that may take a variety of forms. For example, the ladder network may comprise multiple reactive stages (i.e., reactive circuits) each including a combination of reactive components. Any of single value or multiple values of the ladder network may be adjusted based on a desired response. Some filter circuits may be less desirable such as a filter circuit 1126 that creates a simple reactance shift regardless of the characteristic impedance chosen (e.g., a three pole Butterworth low pass filter with a 3 dB point set to the operating frequency). The ladder network may also include multiple filters, in which case one or multiple filters may be varied using a common parameter.

Furthermore, as described above, the prototype class, the type of filter, the cutoff frequency, and the characteristic impedance of the filter circuit 1126 may also be configured to achieve a desired impedance response that can be used to be mapped to the high efficiency curve 902. The prototype class may indicate how the component values are chosen based on the other parameters. Examples of these classes may include Butterworth filters, Chebyshev filters, or other prototypes. The type of filter circuit 1126 can be a low pass, high pass, band pass, notch, or combination thereof. The cutoff frequency may be a 3 dB attenuation point, although the cutoff frequency may vary depending on the prototype class. The characteristic impedance may be the target real impedance of the filter circuit 1126 if this were being used in a single impedance circuit (e.g., a 50L RF circuit).

According to one embodiment, given a set of several of these characteristics (e.g., selecting the driver circuit design and driver circuit filter series reactance 1108), non-selected characteristics (e.g., a filter circuit 1126 design) may be derived that allows the system to perform an impedance transformation of a range of real load impedances that transforms the real load impedance to a value for which the driver circuit 1124 is highly efficient. For example, a high efficiency curve 902 may take the form of a half circle on the complex impedance plane with the origin on the complex axis as shown in FIG. 9. Ladder networks of reactive stages including any combination of reactive components used for the filter circuit 1126 may map changes in resistance onto either a change in resistance or onto a half circle on the complex impedance plane with the origin on the complex axis. The changes in resistances mapped to half circles by the filter circuit 1124 may map various reactances onto different half circles of varying radius. When a series reactance placed between the driver circuit 1124 and filter circuit 1126 (e.g., ladder network) has the correct reactance to align the two origins, the desired driver circuit 1124 response is achieved. It may be unnecessary to perfectly match the two half circles. This may particularly be applicable when parasitic resistances are taken into account, which can modify the shape of the semicircles slightly. The following description provides further examples for how this may be accomplished.

Figure 17A:
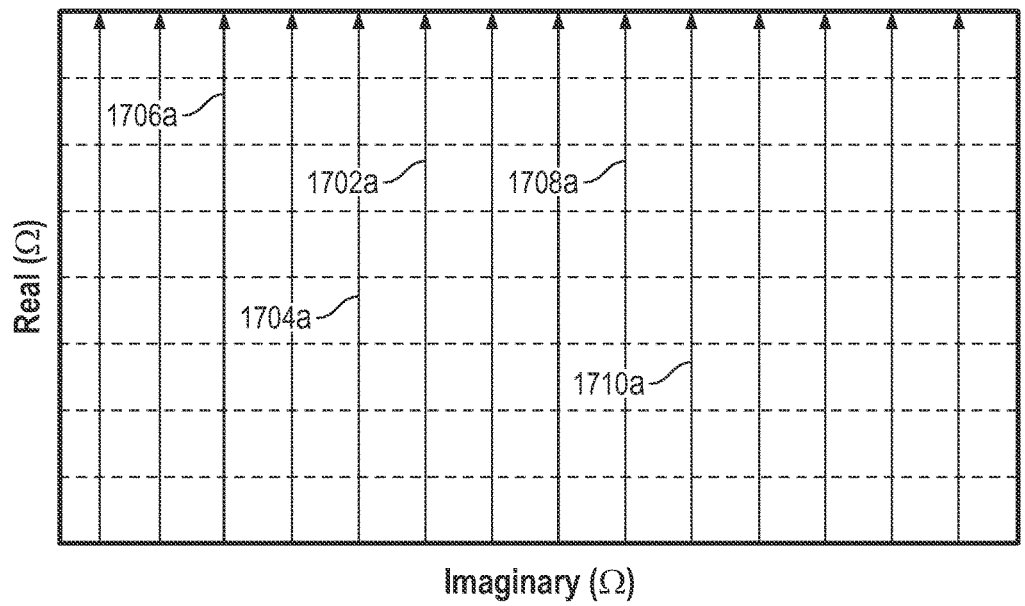
FIGS. 17A and 17B are plots showing exemplary impedance transformations performed by a filter circuit for a range of resistance values for several different reactances of a load presented to the filter circuit.
Figure 17B:
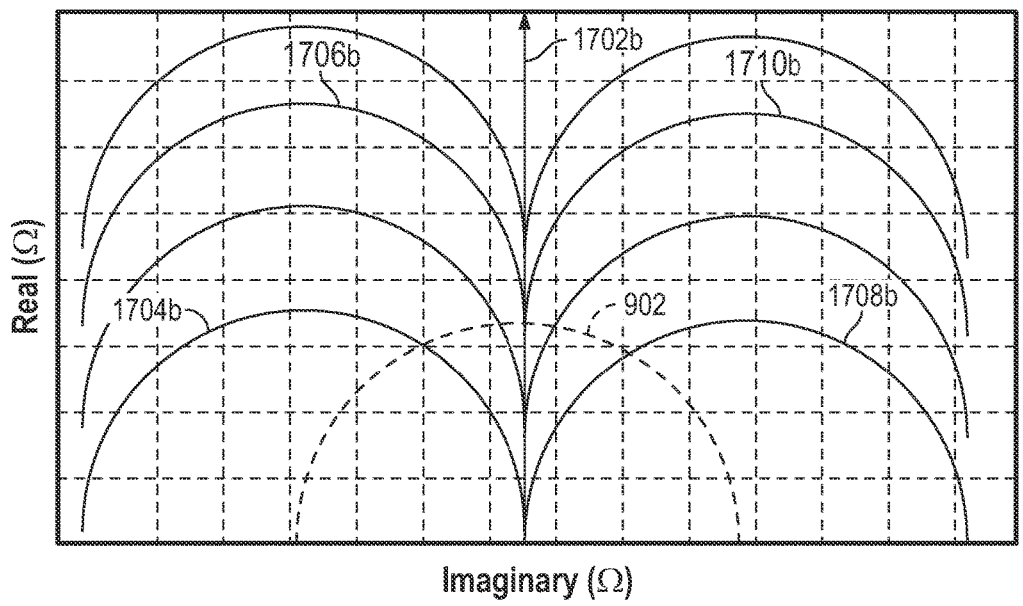

FIGS. 17A and 17B are plots showing exemplary impedance transformations performed by a filter circuit 1124 for a range of resistance values for several different reactances of a load presented to the filter circuit. The curves shown in FIGS. 17A and 17B are examples of a way in which the impedance transformation might be visualized. FIG. 17A shows lines 1702a, 1704a, 1706a, 1708a, and 1710a that correspond to ranges of resistance values that may be presented to a filter circuit 1126 for several exemplary discrete reactance values.

FIG. 17B shows examples of a corresponding impedance transformation for a particular filter design at each reactance over the range of resistance values. For example, the impedance transformation for one particular resistance line 1702a may correspond to a real impedance transformation curve shown as a straight line 1702b (i.e., where the transformation results in a constant reactance). For the other resistance lines 1704a, 1706a, 1708a, and 1710a, the resulting impedance transformation may result in an impedance transformation represented by the semi-circular curves 1704b, 1706b, 1708b, and 1710b respectfully located at different positions along the imaginary axis. It should be appreciated that the semi-circular curves 1704b, 1706b, 1708b, and 1710b may each have a different radius or may otherwise be shaped differently based on the reactance. It should further be appreciated that transformations are meant to depict how each of the resistance lines may possible be transformed to map to a high efficiency line 902 rather than corresponding to actual transformations. For example, the transformations above may be based on a single device charger where a multi device charger may require a wider range of reactances.

One of the impedance transformation curves 1704b, 1706b, 1708b, and 1710b may be correlated to a range of complex impedance values for which a particularly designed driver circuit 1124 is highly efficient such as the high efficiency contour 902 as described with reference FIG. 9. For example, as shown in FIG. 17B, a range of complex values for which the driver circuit 1124 is highly efficient may be represented as the semi-circle 902 with a particular radius. A range of complex impedance values provided by the filter circuit 1126 at a particular reactance (e.g., one of curves 1704b, 1706b, 1708b, and 1710b) may be represented as a semi-circle and may desirably have the same radius as the curve 902. As such, a range of impedances provided by the impedance transformation of a filter circuit 1126 may be found that is directly correlated to a range of impedances for which the driver circuit 1124 is found to be highly efficient. An additional reactance shift may then be provided by an additional impedance adjustment element (e.g., an element inherent to the driver circuit 1124 such as a series reactive component 1108 of the driver circuit 1124 or additionally added component) such that the shifted impedances provided by the filter circuit 1126 and impedance adjustment element 1108 are substantially equivalent to the impedances for which the driver circuit 1124 is highly efficient.

As such, during a design process, characteristics of a driver circuit 1124 may be selected to satisfy various design considerations. In one method, the reactances that map to semicircles of the desired radius may be determined based on the ladder network chosen, what the radius of the semicircle 902 of high efficiency of the driver circuit 1126 is, and whether the series reactance shifts the two semi-circles to be coincident. This may be beneficial in that that the driver circuit 1124 tuning and series reactance may be determined analytically if the desired curve is known.

Another method may include applying the reverse transformation of the series reactance and ladder network (i.e., filter circuit 1126) to the high efficiency curve 902 and determine whether the curve maps to a sufficiently vertical line. This method may be beneficial where it may be performed with a simple impedance transformation, and using the verticality as a single feedback value allows this method to be used with a zero search for automating optimization of the desired variable. This may provide for an more efficient implementation.

According to one possible method, a driver circuit 1124 may be selected (based on desired performance parameters) and then tested to determine the range of complex impedance values for which it satisfies some efficiency threshold (e.g., 90% efficiency and above). Once this range is determined, filter circuit 1126 characteristics may be chosen such that an impedance transformation performed by the filter circuit 1126 transforms a range of real impedance values to a range of complex impedance values that are directly correlated to the range of complex impedance values determined for the driver circuit 1124. Characteristics of an additional impedance adjustment element 1108 may thereafter be determined that performs a shift of the transformed impedances from the filter circuit 1126 to be substantially equivalent (or within some acceptable range) of the complex impedance values determined for the driver circuit 1124.

Alternatively, characteristics of the filter circuit 1126 may be determined to satisfy various design considerations before selecting a driver circuit 1124 design. The resulting impedance transformation performed by the filter circuit 1126 may then be determined. Information about the impedance transformation performed by the filter circuit 1126 may be used to choose a particular driver circuit 1126 design whose range of complex impedance values for which it satisfies some efficiency threshold is correlated to the impedance transformation performed by the filter circuit 1126. Characteristics of an additional impedance adjustment element 1108 may thereafter be determined that perform a shift of the impedances resulting from the filter circuit 1126 to be substantially equivalent (or within some acceptable range) of the complex impedance values for the driver circuit 1124. In this case, it may be necessary to choose a filter circuit type (e.g., a ladder network) that is able to provide an impedance transformation that may be directly correlated to a range of complex impedance values over which a driver circuit 1126 may be highly efficient. Additionally, a characteristic of the impedance adjustment element 1108 may be selected and then the filter circuit 1126 characteristics or driver circuit 1124 characteristics may be derived thereafter.

Figure 18:
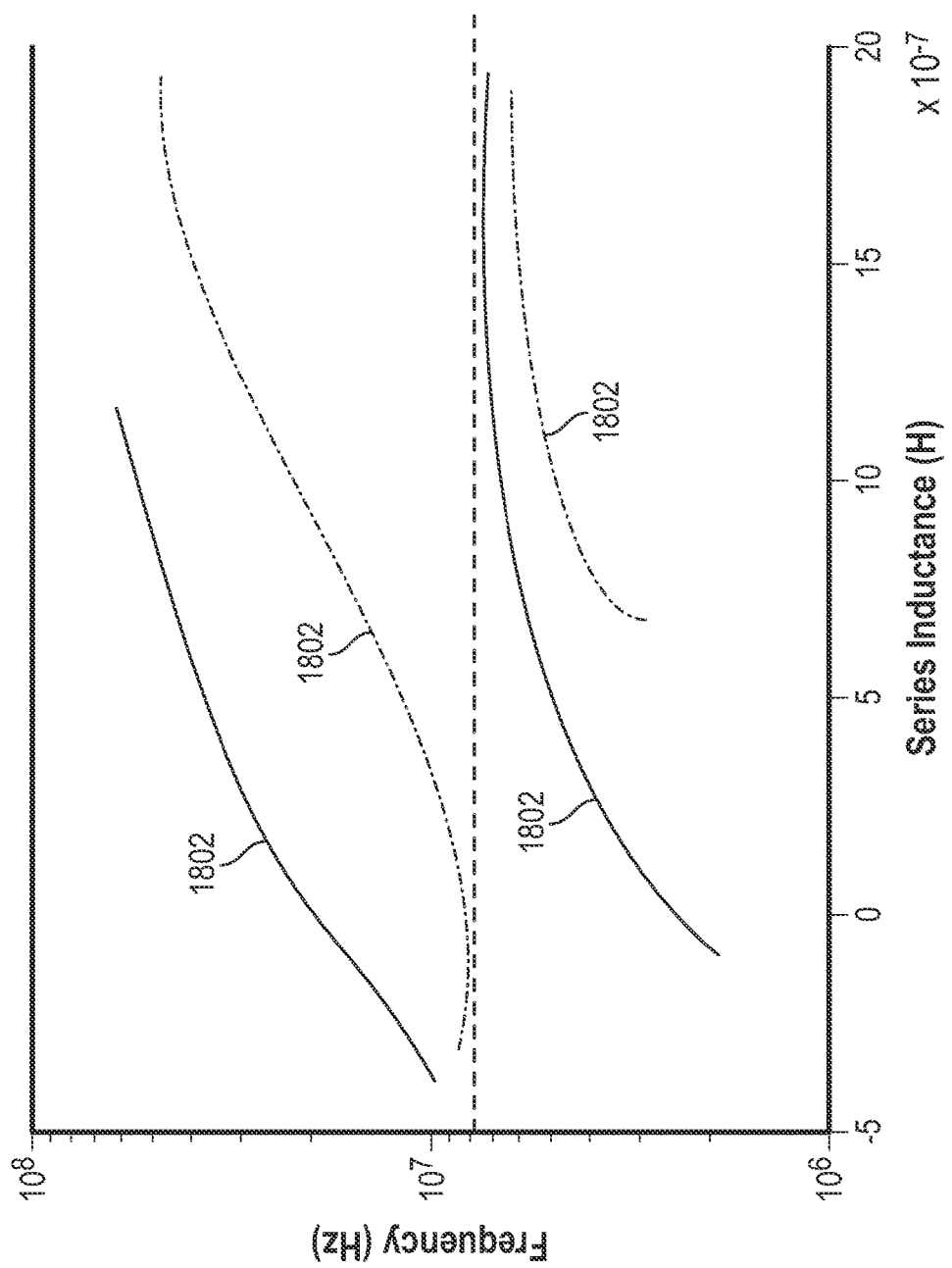
FIG. 18 is a plot showing series inductance as a function of a filter cutoff frequency for a particular operating frequency, driver circuit impedance, and filter impedance.

FIG. 18 is a plot showing a curve 1802 of series inductance 1108 as a function of a filter cutoff frequency for a particular operating frequency, driver circuit impedance, and filter impedance. For example, the plot shown in FIG. 18 could correspond to a plot of series inductance as a function of filter cutoff frequency at 6.78 MHz, for a 15 Ω driver circuit impedance and a 15 Ω filter circuit impedance. To design for different driver circuit impedance, filter circuit impedance, operating frequency, etc., different plots could be generated. As such, FIG. 18A shows how a particular series inductance may be selected for a given set of design characteristics of the driver circuit 1124, the filter circuit 1126 and operating frequency to shift a reactance in order to map the high efficiency curve 902 to the transformed impedance curve of the filter circuit 1126.

Accordingly, by selecting a filter circuit 1126 and series impedance 1108 to perform the impedance transformation as described above, the impedance presented to the driver circuit 1124 may map to the range of complex impedance values for which the driver circuit 1124 is maximally efficient. As such, the driver circuit 1124 may behave as an ideal AC current source (with a source impedance above some ratio of the minimum real load) that supplies a constant current for a range of impedances regardless of the impedance in that range presented to the driver circuit 1124. The particular constant current may be chosen based on the combinations of characteristics used. As such, the wireless power transmitter 404 may be able to source more power as the resistance (i.e., real impedance) increases.

Figure 19:
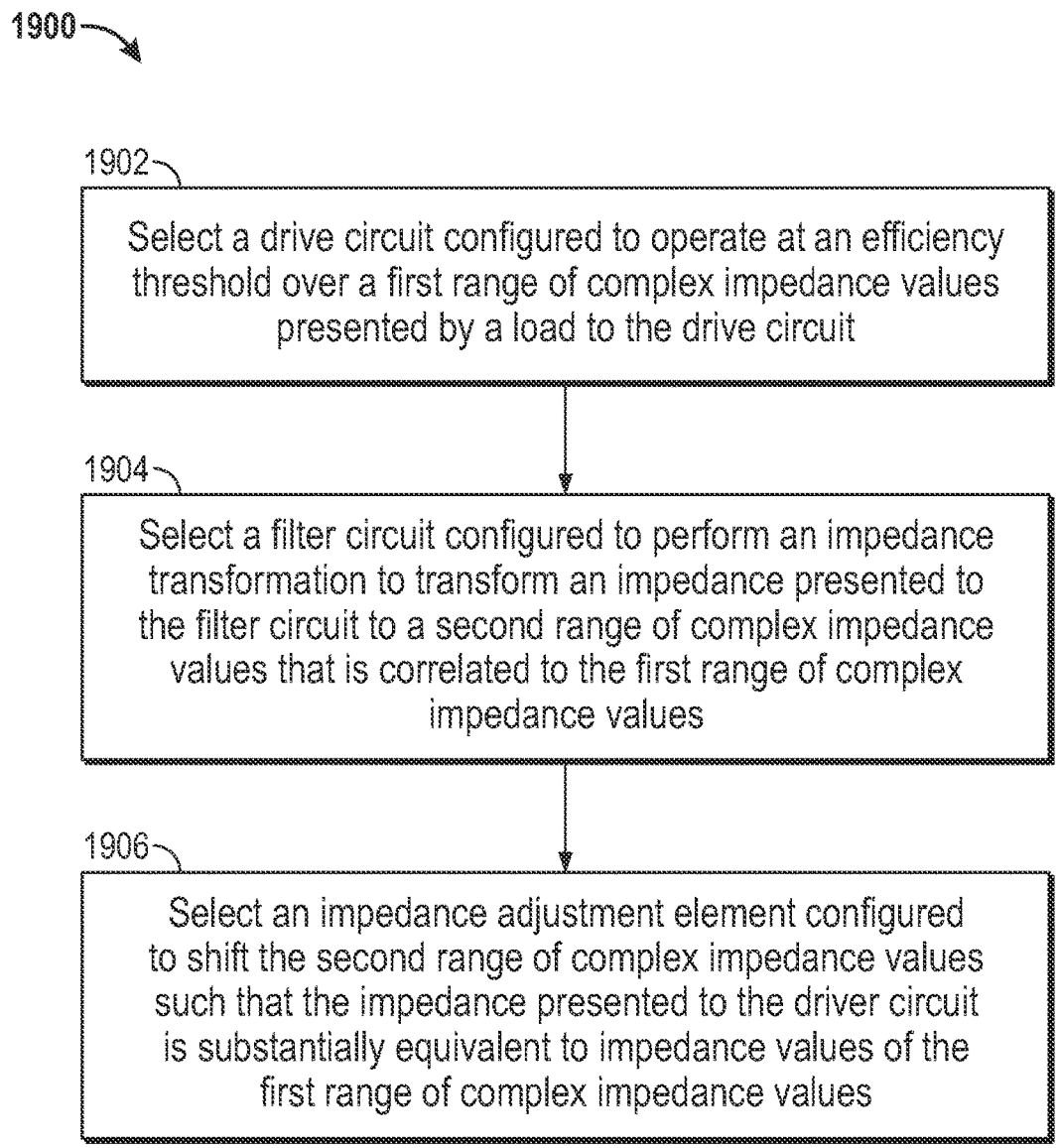
FIG. 19 is a flowchart of an exemplary method for designing a highly efficient transmit circuit.

FIG. 19 is a flowchart of an exemplary method for designing a highly efficient transmit circuit. The transmit circuitry may be configured for wirelessly outputting power to charge or power a receiver device. In block 1902, a driver circuit 1124 may be selected that is configured to operate at an efficiency threshold over a first range of complex impedance values presented by a load to the driver circuit 1124. Based on the characteristics chosen, in block 1904, a filter circuit 1126 may be selected that is configured to perform an impedance transformation to transform an impedance presented to the filter circuit 1126 to a second range of complex impedance values that is correlated to the first range of complex impedance values. In block 1906, an impedance adjustment element 1108 may be selected that is configured to shift the second range of complex impedance values such that the impedance presented to the driver circuit 1124 is substantially equivalent to impedance values of the first range of complex impedance values.

Exemplary embodiments are therefore directed to a filter circuit 1126 that may include an impedance adjustment circuit that modifies the impedance as seen by a transmit circuit 1150 to maintain the efficiency level of a driver circuit 1124 at a high efficiency for a range of impedance values seen by the transmit circuit 1150. The filter circuit 1126 may modify the impedance of the transmit circuit 1150 such that the impedance seen by the driver circuit 1124 corresponds to an impedance value for which the driver circuit 1124 operates at close to its maximum efficiency. In some embodiments, the filter circuit 1126 may modify the impedance as seen by the transmit circuit 1150 to maintain the driver circuit 1124 efficiency at a level that is within substantially 20% of a maximum efficiency level of the driver circuit 1124 for a range of transmit circuit 1150 impedance values. In other embodiments, the filter circuit 1126 may modify the impedance as seen by the transmit circuit 1150 to maintain the driver circuit 1124 efficiency at a level that is within substantially 10% of a maximum efficiency level of the driver circuit 1124 for a range of transmit circuit 1150 impedance values or any level in between 20% and 10%. Maintaining other efficiency levels may also be achieved across various ranges of impedance values in accordance with the principles described herein.

The range of transmit circuit 1150 impedance values for which the filter circuit 1126 may transform while maintaining high efficiency may be defined by a ratio of impedance values of at least two to one. For example, the range may be from 8Ω to 100 Ω. The ratio of impedance values may be at least five to one, or at least ten to one. In one embodiment, the range of impedance values for which the filter circuit 1126 may transform for high efficiency may be from substantially 8 Ω to 80 Ω. The ranges above are merely exemplary and other ranges for which high efficiency may be maintained via the filter circuit 1150 are also contemplated in accordance with exemplary embodiments of the invention. For example, the range of impedance values could be from 25 Ω to 100 Ω, or 50 Ω to 200 Ω.

It should be further appreciated that the filter circuit 1126 may be configured to transform impedance values for other types of loads other than a transmit circuit 1150 and thus principles of various embodiments may be practice with a wide variety of loads. As such, embodiments described herein are not limited to providing wireless power, and exemplary embodiments in accordance with the invention may be applied in other situations where a driver circuit 1124 may drive a variable load of any type having a range of impedance values. In some embodiments, the transmit circuit 1150 may include a transmit coil (or loop antenna) configured to resonate at a frequency of the signal provided by the driver circuit 1150. The transmit circuit 1150 may be configured to wirelessly output power to charge or power a receiver 608a, 608b, and/or 608c as described above. The transmit circuit 1150 may further be configured to wirelessly transmit power to a plurality of receivers 608a, 608b, and 608c. Each of the receivers 608a, 608b, and 608c may alter the impedance seen by the transmit circuit 1150 such that the transmit circuit 1150 may include a wide range of impedance values that may be transformed by the filter circuit 1126. In some cases, the impedance seen by the transmit circuit 1150 may have a reactance that is substantially zero. The filter circuit 1126 may transform the impedance value into a value that has a non-zero reactance such that it is a complex impedance value with a real portion corresponding to resistance and an imaginary portion corresponding to a reactance.

In some embodiments, the filter circuit 1126 may be a passive circuit and may not require added logic or control signals to operate. The filter circuit 1126 may be a low pass filter circuit. The low pass filter may be a 3 pole Butterworth filter. The 3 pole Butterworth filter may have a 3 dB bandwidth of the operating frequency of the driver circuit 1124. The filter circuit 1126 may further be configured to remove harmonic components of the signal output by the driver circuit 1124 as described above. In some cases, the cutoff frequency of the filter circuit 1126 may be higher or lower than the operating frequency of the driver circuit 1124. It should be appreciated that a wide variety of filter circuit designs may be used in accordance with exemplary embodiments and may be selected as described above with reference to FIGS. 17-20.

The amount of power provided by the driver circuit 1124 may be configured to increase as an amount of the resistive portion of the impedance seen by the driver circuit 1124 increases. This may allow for continually delivering higher power while maintaining efficiency as more wireless power receivers 608a, 608b, and 608c receive power from the transmit circuit 1150. Furthermore, the filter circuit 1126 may allow such that a magnitude of the impedance seen by driver circuit 1124 at which maximum power may be provided is higher than the magnitude of the impedance seen by the driver circuit 1124 at which maximum efficiency of the driver circuit 1124 is provided. As such, the driver circuit 1124 may perform as a constant current source over a range of resistances (i.e., real impedance values). As described above, the driver circuit 1124 may be a class E amplifier or other amplifier such as switching amplifier. The driver circuit 1124 may include other types of amplifiers as described above.

It should be further appreciated that while shown as a filter circuit 1126, other types of circuits, components, or modules may be used to perform the type of impedance transformation as described above to transform a range of impedance values into a complex value for which a driver circuit 1124 is highly efficient, in accordance with the principles described herein.

Figure 20:
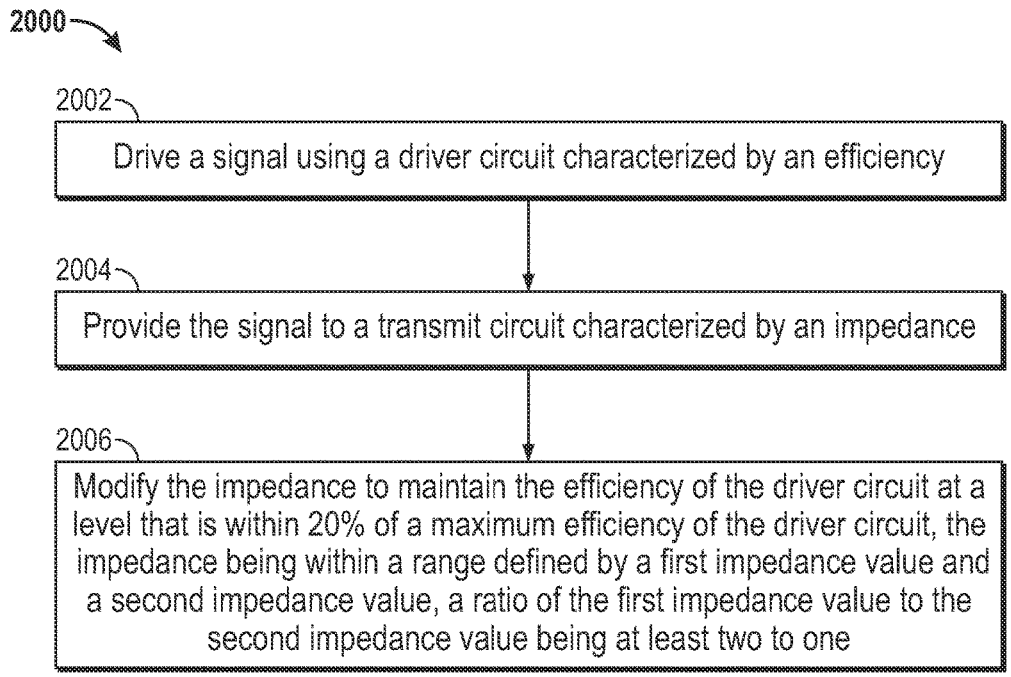
FIG. 20 is a flow chart of an exemplary method for filtering a transmit signal.

FIG. 20 is a flow chart of an exemplary method for filtering a driver circuit signal. The method may be performed by the circuit of FIG. 11. In block 2002, a driver circuit 1124 outputs a signal at a driver circuit efficiency. In block 2004, the signal is provided to a transmit circuit 1150 characterized by an impedance. This impedance may vary in response to, for example, a variable number of wireless power receivers 608a, 608b, and 608c. In block 2006, a filter circuit modifies the impedance to maintain the driver circuit efficiency at a level that is within 20% of a maximum efficiency of the driver circuit 1124. Other efficiency levels are also contemplated as described above. The impedance may be characterized by a complex impedance value, where the complex impedance value may be within a range defined by a first real impedance value and a second real impedance value. The ratio of the first real impedance value to the second real impedance value may be at least two to one. The first real impedance value and the second real impedance values may be substantially minimum and maximum impedance values. The ratio may be five to one or ten to one. In one embodiment, the impedance range may be from 8 Ω to 80 Ω. Other ranges, as described above, are further contemplated. The range may further be defined by a first imaginary impedance value and a second imaginary impedance value. A ratio of the magnitude of the difference between the first imaginary impedance value and the second imaginary impedance value to the magnitude of the difference between the first real impedance value and the second real impedance may be at least one of 1:2, 2:1, 1:1, 3:2, and 2:3 etc. In one embodiment, the first real impedance value may be substantially four ohms, the second real impedance value may be substantially forty ohms, the first imaginary impedance value may be substantially negative four ohms, and the second imaginary impedance value may be substantially 50 ohms.

Figure 21:
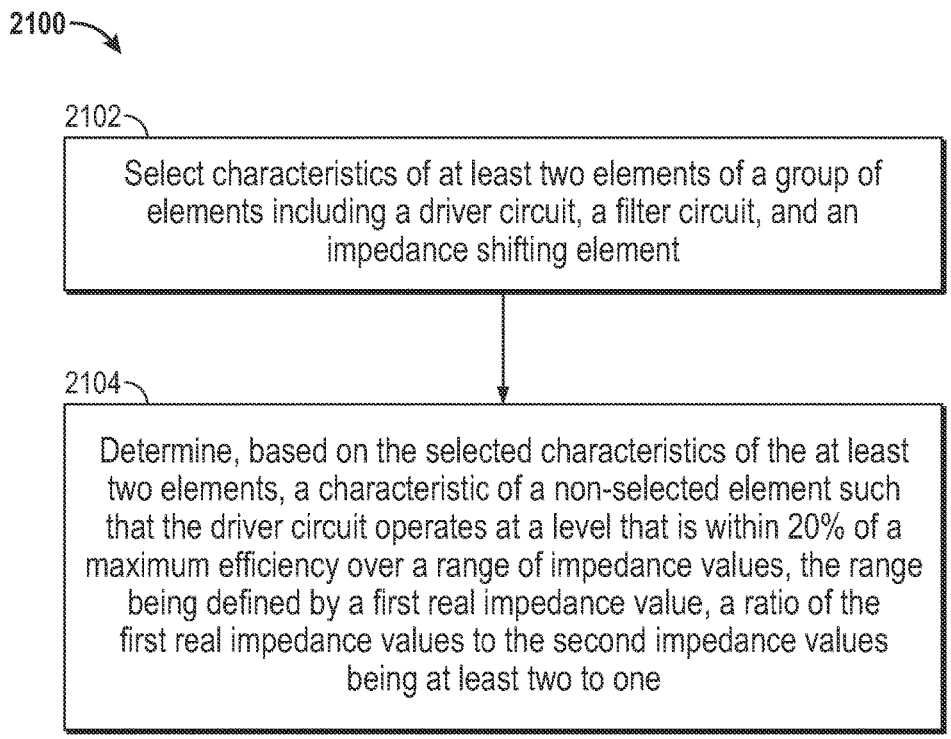
FIG. 21 is a flowchart of an exemplary method for designing a power transmitter apparatus.

FIG. 21 is a flowchart of an exemplary method for designing a power transmitter apparatus. In block 2102, characteristics of at least two elements of a group of elements including a driver circuit 1124, a filter circuit 1126, and an impedance shifting 1108 element may be selected. In block 2104, based on the selected characteristics of the at least two elements, a characteristic of a non-selected element may be selected such that the driver circuit 1124 operates at a level that is within 20% of a maximum efficiency over a range of complex impedance values, the range being defined by a first real impedance value and a second real impedance value, a ratio of the first real impedance values to the second impedance values being at least two to one. The range may also be further defined by a first imaginary impedance value and a second imaginary impedance value. A ratio of the magnitude of the difference between the first imaginary impedance value and the second imaginary impedance value to the magnitude of the difference between the first real impedance value and the second real impedance value may be at least one of 1:2, 2:1, 1:1, 3:2, 2:3, etc. as described in further detail above. The filter circuit 1126 may include a ladder network circuit including a variable number of poles. Characteristics of the driver circuit 1124 may include at least one of a driver circuit frequency and a driver circuit impedance. Characteristics of the filter circuit may include at least one of a number of poles, a type of filter circuit selected from a low pass filter, a high pass filter, or a combination thereof, a characteristic impedance, and a cutoff frequency. Characteristics of the impedance shifting element may include an amount of impedance shift. The impedance shifting element ay include an inductor (e.g., the series inductor 1108). The impedance shifting element may include a capacitor. The impedance shifting element may include both an inductor and capacitor. The driver circuit 1124 may include a switching amplifier circuit of a type including at least a class E amplifier circuit, where a filter circuit is electrically connected between a series inductor of the switching amplifier and a series capacitor of the switching amplifier circuit. The impedance shifting element may modify the value of series elements inherent in the driver circuit 1124.

Figure 22:
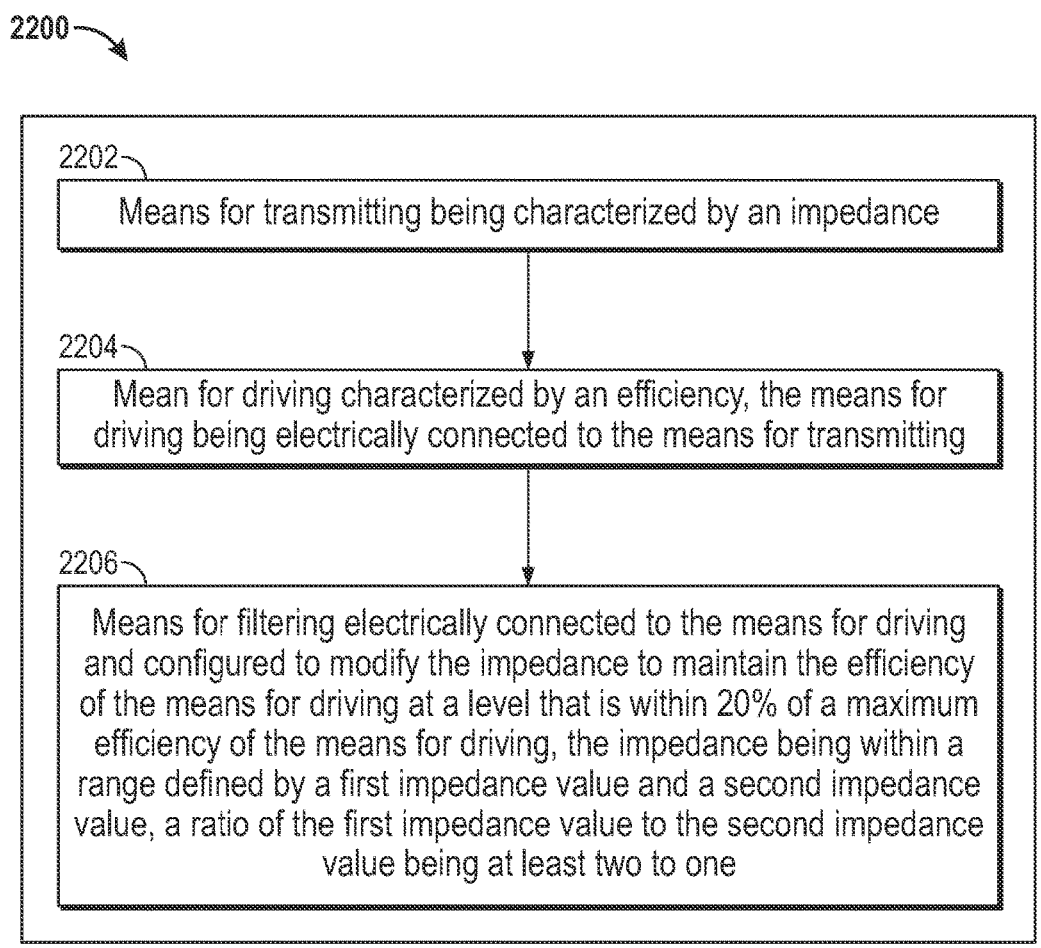
FIG. 22 is a functional block diagram of a transmitter, in accordance with an exemplary embodiment of the invention.

FIG. 22 is a functional block diagram of a transmitter, in accordance with an exemplary embodiment of the invention. Device 2200 comprises means 2202, 2204 and 2206 for the various actions discussed with respect to FIGS. 1-21 that may be electrically connected.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations. For example, means of transmitting may include a transmit circuit. Means for driving may include a driver circuit. Means for filtering may comprise a filter circuit.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the exemplary embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the exemplary embodiments of the invention.

The various illustrative logical blocks, modules, and circuits described in connection with the exemplary embodiments disclosed herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the exemplary embodiments disclosed herein may be embodied directly in hardware, in a software module executed by a processor, or in a combination of the two. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD ROM, or any other form of storage medium known in the art. An exemplary storage medium is coupled to the processor such that the processor may read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary embodiments, the functions described may be implemented in hardware, software, firmware, or any combination thereof. If implemented in software, the functions may be stored on or transmitted over as one or more instructions or code on a computer readable medium. Computer readable media includes both computer storage media and communication media including any medium that facilitates transfer of a computer program from one place to another. A storage media may be any available media that may be accessed by a computer. By way of example, and not limitation, such computer readable media may comprise RAM, ROM, EEPROM, CD ROM or other optical disk storage, magnetic disk storage or other magnetic storage devices, or any other medium that may be used to carry or store desired program code in the form of instructions or data structures and that may be accessed by a computer. Also, any connection is properly termed a computer readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu ray disc where disks usually reproduce data magnetically, while discs reproduce data optically with lasers. Combinations of the above should also be included within the scope of computer readable media.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The previous description of the disclosed exemplary embodiments is provided to enable any person skilled in the art to make or use the present invention. Various modifications to these exemplary embodiments will be readily apparent to those skilled in the art, and the generic principles defined herein may be applied to other embodiments without departing from the spirit or scope of the invention. Thus, the present invention is not intended to be limited to the exemplary embodiments shown herein but is to be accorded the widest scope consistent with the principles and novel features disclosed herein.

What is claimed is:

1. A wireless power transmitter apparatus, comprising:
   a transmit coil configured to generate a magnetic field for wirelessly transferring power to one or more receiver devices to power or charge respective loads of the one or more receiver devices, a resistive part of an impedance presented to the transmit coil varying over a range of real impedance values in response to changes in positioning or presence of the one or more receiver devices within the magnetic field;
a driver circuit electrically connected to the transmit coil and comprising:
a first choke inductor electrically connected between a first node and a voltage source;
a switch electrically connected between the first node and a ground reference;
a shunt capacitor electrically connected in to the first node and electrically connected in parallel with the switch; and
a second inductor electrically connected to the first node; and
a passive filter circuit electrically connected between the driver circuit and the transmit coil, the passive filter circuit comprising one or more inductors or capacitors having fixed values selected that transform the impedance presented by the transmit coil to the passive filter circuit to a second impedance that is presented to the driver circuit, the second impedance transformed to one of a range of complex impedance values falling along a contoured line or half circuit when plotted in a complex number coordinate system, the transformed second impedance maintaining an efficiency of the driver circuit within 20% of a maximum efficiency value of the driver circuit irrespective of changes in the positioning or presence of the one or more receiver devices within the magnetic field.

2. The wireless power transmitter apparatus of claim 1, wherein an amount of power provided to the transmit coil increases as an amount of a resistive portion of the impedance increases.

3. The wireless power transmitter apparatus of claim 1, wherein the passive filter circuit comprises a ladder network of reactive circuits, each of the reactive circuits comprising a combination of reactive components.

4. The wireless power transmitter apparatus of claim 1, further comprising an impedance adjustment element configured to cause a reactive shift between the driver circuit and the passive filter circuit.

5. The wireless power transmitter apparatus of claim 1, wherein the transmit coil comprises a transmit coil electrically connected to the output of the passive filter circuit, the transmit coil configured to inductively transmit power to charge or power the one or more receiver devices.

6. The wireless power transmitter apparatus of claim 1, wherein a value of the second impedance comprises a complex value comprising a real part corresponding to a resistance value and an imaginary part corresponding to a non-zero reactance value.

7. The wireless power transmitter apparatus of claim 1, wherein the passive filter circuit comprises a third inductor electrically in parallel between a second and third capacitor all having fixed values.

8. The wireless power transmitter apparatus of claim 1, wherein the impedance presented to the filter circuit is between 8 ohms and 80 ohms.

9. The wireless power transmitter apparatus of claim 1, wherein the impedance presented to the filter circuit corresponds to a real impedance range between four ohms and forty ohms and between and an imaginary impedance range between negative 4j ohms and 50j ohms.

10. The wireless power transmitter apparatus of claim 1, wherein a cutoff frequency of the passive filter circuit is higher or lower than an operating frequency of the driver circuit.

11. A transmitter device, comprising:
a transmit coil configured to generate a magnetic field for wirelessly transferring power to one or more receiver devices to power or charge respective loads of the one or more receiver devices, a resistive part of an impedance presented to the transmit coil varying over a range of real impedance values in response to changes in positioning or presence of the one or more receiver devices within the magnetic field;
a class E driver circuit comprising a switch; and
a passive filter circuit electrically connected between the driver circuit and the transmit coil, the passive filter circuit comprising one or more reactive elements including a capacitor and an inductor having fixed values and configured to transform the impedance presented by the transmit coil to the class E driver circuit to one of a range of complex impedance values falling along a contoured line or half circuit when plotted in a complex number coordinate system, the transformed impedance maintaining an efficiency level of the class E driver circuit within 20% of a maximum efficiency of the driver circuit, irrespective of the changes in the positioning or presence of the one or more receiver devices within the magnetic field.

12. The transmitter device of claim 11, wherein the resistive part of the impedance varies, and an imaginary portion is constant, in response to changes in positioning or presence of the one or more receiver devices within the magnetic field.

13. The transmitter device of claim 11, wherein the each of the range of complex impedance value points along the contoured line or half circle correspond to common efficiency level of the class-E amplifier.

14. The transmitter device of claim 11, wherein the impedance of the transmit coil comprises a reactance that is zero before the impedance is modified.

15. The transmitter device of claim 11, wherein an amount of power provided to the transmit coil increases as an amount of a resistive portion of the impedance increases.

16. The transmitter device of claim 11, wherein a first magnitude of the impedance at which a maximum power amount is output by the driver circuit is higher than a second magnitude of the impedance at which maximum efficiency of the driver circuit is provided.

17. The transmitter device of claim 11, wherein the passive filter circuit comprises a ladder network of reactive circuits, each of the reactive circuits comprising a combination of reactive components.

18. The transmitter device of claim 11, further comprising an impedance adjustment element configured to cause a reactive shift between the driver circuit and the passive filter circuit.

19. The transmitter device of claim 11, wherein the range of complex impedance values is defined by a first real impedance value and a second real impedance value, a ratio of the first real impedance value to the second real impedance value being one of at least five to one and at least ten to one.

20. The transmitter device of claim 19, wherein the first real impedance value comprises 8 ohms and the second real impedance value comprises 80 ohms.

21. The transmitter device of claim 11, wherein the range of complex impedance values is defined by a first real impedance value and a second real impedance value, a first ratio of the first real impedance value to the second real impedance value being at least two to one, wherein the range of complex impedance values is further defined by a first imaginary impedance value and a second imaginary impedance value, wherein a second ratio of a first magnitude of a difference between the first imaginary impedance and the second imaginary impedance value to a second magnitude of a difference between the first real impedance value and the second real impedance value is equal to at least one of one to two, two to three, one to one, three to two, and two to one.

22. The transmitter device of claim 21, wherein the first real impedance value is four ohms, wherein the second real impedance value is forty ohms, wherein the first imaginary impedance value is negative four ohms, and wherein the second imaginary impedance value is 50 ohms.

23. The transmitter device of claim 11, wherein the range of complex impedance values comprises a complex value comprising a real part corresponding to a resistance value and an imaginary part corresponding to a non-zero reactance value.

24. The transmitter device of claim 11, wherein a cutoff frequency of the passive filter circuit is higher or lower than an operating frequency of the driver circuit.

25. The transmitter device of claim 11, wherein the passive filter circuit is further configured to remove harmonic components of a signal generated by the driver circuit operating at an operating frequency.

26. A transmitter device, comprising:
means for generating a magnetic field for wirelessly transferring power to one or more receiver devices to power or charge respective loads of the one or more receiver devices, a resistive part of an impedance presented to the means for generating a magnetic field varying over a range of real impedance values in response to changes in positioning or presence of the one or more receiver devices within the magnetic field;
means for driving comprising a switch; and
means for passive filtering, the means for passive filtering being electrically connected between the means for driving and the means for generating, the means for passive filtering comprising one or more reactive elements including a capacitor and an inductor having fixed values, and configured to transform the impedance presented by the means for generating a magnetic field to the means for driving to one of a range of complex impedance values falling along a contoured line or half circuit when plotted in a complex number coordinate system, the transformed impedance maintaining an efficiency level of the means for driving within 20% of a maximum efficiency of the means for driving, irrespective of the changes in the positioning or presence of the one or more receiver devices within the magnetic field.

27. The transmitter device of claim 26, wherein the range of complex impedance values is defined by a first real impedance value and a second real impedance value, a ratio of the first real impedance value to the second real impedance value being one of at least five to one and at least ten to one.

28. The transmitter device of claim 27, wherein the first real impedance value is 8 ohms and the second real impedance value is 80 ohms.

29. The transmitter device of claim 26, wherein the range of complex impedance values is defined by a first real impedance value and a second real impedance value, a first ratio of the first real impedance value to the second real impedance value being at least two to one, wherein the range of complex impedance values is further defined by a first imaginary impedance value and a second imaginary impedance value, wherein a second ratio of a first magnitude of a difference between the first imaginary impedance and the second imaginary impedance value to a second magnitude of a difference between the first real impedance value and the second real impedance value is equal to at least one of one to two, two to three, one to one, three to two, and two to one.

30. The transmitter device of claim 29, wherein the first real impedance value is four ohms, the second real impedance value is forty ohms, the first imaginary impedance value is negative four ohms, and the second imaginary impedance value is 50 ohms.

31. The transmitter device of claim 26, wherein the means for generating comprises a transmit coil comprising a transmit coil electrically connected to the output of the means for passive filtering, the transmit coil configured to wirelessly transmit power to charge or power a receiver device.

32. A method for filtering a transmit signal, comprising:
generating a magnetic field for wirelessly transferring power to one or more receiver devices to power or charge respective loads of the one or more receiver devices, via a transmit coil, a resistive part of an impedance presented to the transmit coil varying over a range of real impedance values in response to changes in positioning or presence of the one or more receiver devices within the magnetic field;
driving a signal using a class E driver circuit comprising a switch;
providing the signal to the transmit coil; and
transforming the impedance presented by the transmit coil to the driver circuit using a passive filter circuit electrically connected between the driver circuit and the transmit coil, the passive filter circuit comprising one or more reactive elements including a capacitor and an inductor having fixed values and configured to transform the impedance presented by the transmit coil to the driver circuit to one of a range of complex impedance values falling along a contoured line or half circuit when plotted in a complex number coordinate system, the transformed impedance maintaining an efficiency level of the class E driver circuit within 20% of a maximum efficiency of the driver circuit, irrespective of the changes in the positioning or presence of the one or more receiver devices within the magnetic field.

33. The method of claim 32, wherein the range of complex impedance values is defined by a first real impedance value and a second real impedance value, a ratio of the first real impedance value to the second real impedance value being one of at least five to one and at least ten to one.

34. The method of claim 33, wherein the first real impedance value comprises 8 ohms and the second real impedance value comprises 80 ohms.

35. The method of claim 32, wherein range of complex impedance values is defined by a first real impedance value and a second real impedance value, a first ratio of the first real impedance value to the second real impedance value being at least two to one, wherein the range of complex impedance values is further defined by a first imaginary impedance value and a second imaginary impedance value, wherein a second ratio of a first magnitude of a difference between the first imaginary impedance and the second imaginary impedance value to a second magnitude of a difference between the first real impedance value and the second real impedance value is equal to at least one of one to two, two to three, one to one, three to two, and two to one.

36. The method of claim 35, wherein the first real impedance value is four ohms, wherein the second real impedance value is forty ohms, wherein the first imaginary impedance value is negative four ohms, and wherein the second imaginary impedance value is 50 ohms.

37. The method of claim 32, wherein the impedance of the transmit coil comprises a reactance that is zero before transforming the impedance.

38. The method of claim 32, wherein the plurality of impedance values comprises a complex value comprising a real part corresponding to a resistance value and an imaginary part corresponding to a non-zero reactance value.

39. The method of claim 38, wherein a cutoff frequency of the passive filter circuit is higher or lower than an operating frequency of the driver circuit.

40. The method of claim 32, further comprising removing harmonic components of the signal generated by the driver circuit operating at an operating frequency.

41. The method of claim 32, wherein an amount of power provided to the transmit coil increases linearly as an amount of a resistive portion of the impedance increases.

42. The method of claim 32, wherein a first magnitude of the impedance at which a maximum power amount is output by the driver circuit is higher than a second magnitude of the impedance at which maximum efficiency of the driver circuit is provided.

43. The method of claim 32, wherein transforming comprises transforming using the passive filter circuit and an impedance adjustment element configured to cause a reactive shift of a transformed impedance produced by the passive filter circuit.

44. A method for designing a power transmitter apparatus, the method comprising:
  selecting characteristics of at least two elements of a group of elements including:
  a class E driver circuit comprising a switch,
  a passive filter circuit configured to transform an impedance presented to the class E driver circuit as a resistive part of an impedance presented to a transmit coil varies over a range of real impedance values in response to changes in positioning or presence of one or more receiver devices within a magnetic field generated by the transmit coil, the transformed impedance in a range of complex impedance values falling along a contoured line or half circuit when plotted in a complex number coordinate system, and
  an impedance shifting element; and
  determining, based on the selected characteristics of the at least two elements, a characteristic of a non-selected element such that the transformed impedance maintains an efficiency level of the class E driver circuit within 20% of a maximum efficiency of the driver circuit, irrespective of the changes in the positioning or presence of the one or more receiver devices within the magnetic field.

45. The method of claim 44, wherein the driver is electrically connected to the impedance shifting element and the passive filter circuit.

46. The method of claim 44, wherein characteristics of the driver circuit comprise at least one of a driver circuit frequency and a driver circuit impedance.

47. The method of claim 44, wherein characteristics of the passive filter circuit comprises at least one of a number of poles, a type of passive filter circuit selected from a low pass filter, a high pass filter, or a combination thereof, a characteristic impedance, and a cutoff frequency.

48. The method of claim 44, wherein characteristics of the impedance shifting element comprises an amount of impedance shift.

49. The method of claim 44, wherein the impedance shifting element comprises at least on of an inductor, a capacitor, or any combination thereof.

50. The method of claim 44, wherein the impedance shifting element comprises one of a series element inherent in the driver circuit.

51. The method of claim 44, wherein the range of complex impedance values is defined by a first real impedance value and a second real impedance value, a ratio of the first real impedance value to the second real impedance value being one of at least five to one and at least ten to one.

52. The method of claim 51, wherein the first real impedance value comprises 8 ohms and the second real impedance value comprises 80 ohms.

53. The method of claim 44, wherein the range of complex impedance values is defined by a first real impedance value and a second real impedance value, a first ratio of the first real impedance value to the second real impedance value being at least two to one, wherein the range of complex impedance values is further defined by a first imaginary impedance value and a second imaginary impedance value, wherein a second ratio of a first magnitude of a difference between the first imaginary impedance and the second imaginary impedance value to a second magnitude of a difference between the first real impedance value and the second real impedance value is equal to at least one of one to two, two to three, one to one, three to two, and two to one.

54. The method of claim 53, wherein the first real impedance value is four ohms, wherein the second real impedance value is forty ohms, wherein the first imaginary impedance value is negative four ohms, and wherein the second imaginary impedance value is 50 ohms.

* * * * *